US011926154B2

(12) United States Patent
Fujihashi et al.

(10) Patent No.: US 11,926,154 B2
(45) Date of Patent: Mar. 12, 2024

(54) LIQUID EJECTING APPARATUS

(71) Applicant: SEIKO EPSON CORPORATION, Tokyo (JP)

(72) Inventors: Kazuma Fujihashi, Nagano (JP); Yasuhiko Kosugi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 176 days.

(21) Appl. No.: 17/656,666

(22) Filed: Mar. 28, 2022

(65) Prior Publication Data

US 2022/0305771 A1 Sep. 29, 2022

(30) Foreign Application Priority Data

Mar. 29, 2021 (JP) ................................ 2021-054827

(51) Int. Cl.
*B41J 2/045* (2006.01)

(52) U.S. Cl.
CPC ......... *B41J 2/0451* (2013.01); *B41J 2/04541* (2013.01); *B41J 2/04586* (2013.01)

(58) Field of Classification Search
CPC ........................................................ B41J 2/045
See application file for complete search history.

(56) References Cited

U.S. PATENT DOCUMENTS

2020/0086658 A1* 3/2020 Matsumoto .......... B41J 2/04563
2020/0091041 A1* 3/2020 Matsumoto ............ B41J 2/0451

FOREIGN PATENT DOCUMENTS

JP 2020-142499 A 9/2020
JP 2020-185747 A 11/2020

* cited by examiner

*Primary Examiner* — Scott A Richmond
(74) *Attorney, Agent, or Firm* — Global IP Counselors, LLP

(57) ABSTRACT

A liquid ejecting apparatus includes a digital signal output circuit and a liquid accommodating container, in which the print head includes a supply port, a nozzle plate, a substrate having first and second sides positioned opposite to each other, third and fourth sides positioned opposite to each other, a first surface, and a second surface, a connector to which the digital signal is input, and an integrated circuit to which the digital signal is input via the connector and that outputs an abnormality detection signal, the connector is provided on the first surface, the integrated circuit is provided on the second surface, the substrate includes an annular wiring electrically coupled to the integrated circuit, and the annular wiring is disposed in an annular shape along an outer periphery of the substrate including the first side, the second side, the third side, and the fourth side.

15 Claims, 14 Drawing Sheets

| [SIH, SIL] | | [1, 1] (LD) | [1, 0] (MD) | [0, 1] (SD) | [0, 0] (ND) |
|---|---|---|---|---|---|
| S1 | T1 | H | H | H | L |
| | T2 | H | L | L | L |
| S2 | T1 | L | L | L | H |
| | T2 | L | H | L | L |

LIQUID EJECTING APPARATUS

The present application is based on, and claims priority from JP Application Serial Number 2021-054827, filed Mar. 29, 2021, the disclosure of which is hereby incorporated by reference herein in its entirety.

BACKGROUND

1. Technical Field

The present disclosure relates to a liquid ejecting apparatus.

2. Related Art

A liquid ejecting apparatus such as an ink jet printer ejects a liquid such as ink filled in a cavity from a nozzle by driving a piezoelectric element provided in a print head with a drive signal to form characters and images on a medium. In such a liquid ejecting apparatus, most of the liquid ejected from the nozzle lands on the medium to form images.

However, there are some cases in which a part of the liquid ejected from the nozzle becomes a mist before landing on the medium and floats inside the liquid ejecting apparatus as a liquid mist. Further, there are also some cases in which, even after the liquid ejected from the nozzle lands on the medium, the landed liquid becomes a mist and floats inside the liquid ejecting apparatus as a liquid mist due to the air flow generated by the transport of the medium on which the liquid is ejected. Since the liquid mist floating inside such a liquid ejecting apparatus is very minute, it is charged by the Lenard effect. Therefore, there are some cases in which the liquid mist is attracted to a conductive portion such as wiring patterns that propagate various signals to a print head and terminals that electrically couple cables to the print head, and as a result, enters into the print head.

When the liquid mist enters into the print head, the liquid mist is attracted to the wiring patterns, the terminals, electronic components, or the like, provided inside the print head. When the liquid mist adheres between the wiring patterns and between the terminals, a short-circuit abnormality occurs in the print head, and as a result, the print head and the liquid ejecting apparatus may malfunction.

Malfunction of the print head and the liquid ejecting apparatus caused by the liquid mist entering into the print head is not limited to the liquid mist entering into the print head, and the malfunction may also occur, for example, when a liquid such as ink supplied to the print head leaks from joints or the like, and the leaked liquid enters into the print head and the entering liquid adheres to the wiring pattern or terminal provided inside the print head.

Regarding a problem that may occur due to the entering of liquid into the print head, for example, JP-A-2020-142499 discloses a technique in which a print head that ejects a liquid includes an integrated circuit for detecting an abnormality in the print head and the risk of a liquid such as ink adhering to the integrated circuit is reduced even if the ink enters into the print head, thereby reducing the risk of malfunction of the integrated circuit.

However, in the technique described in JP-A-2020-142499, there is room for improvement in terms of the detection accuracy of the liquid entering into the print head.

SUMMARY

According an aspect of the present disclosure, there is provided a liquid ejecting apparatus including a print head that ejects a liquid, a digital signal output circuit that outputs a digital signal to the print head, and a liquid accommodating container that supplies the liquid to the print head, in which the print head includes a supply port to which the liquid is supplied from the liquid accommodating container, a nozzle plate having a plurality of nozzles that eject the liquid, a substrate having first and second sides positioned opposite to each other, third and fourth sides positioned opposite to each other, a first surface, and a second surface different from the first surface, a connector to which the digital signal is input, and an integrated circuit to which the digital signal is input via the connector and that outputs an abnormality detection signal indicating presence or absence of an abnormality in the print head, the connector is provided on the first surface, the integrated circuit is provided on the second surface, the substrate includes an annular wiring electrically coupled to the integrated circuit, and the annular wiring is disposed in an annular shape along an outer periphery of the substrate including the first side, the second side, the third side, and the fourth side.

DESCRIPTION OF EXEMPLARY EMBODIMENTS

Hereinafter, preferred embodiments of the present disclosure will be described with reference to the drawings. The drawings used are for convenience of description. It should be noted that the present embodiment described below does not unreasonably limit the content of the present disclosure described in the claims. Further, not all of the configurations described below are essential constituent requirements of the present disclosure.

1. Functional Configuration of Liquid Ejecting Apparatus

The functional configuration of a liquid ejecting apparatus 1 in the present embodiment will be described with reference to FIGS. 1A and 1B. The liquid ejecting apparatus 1 in the present embodiment will be described by taking as an example a so-called ink jet printer that forms a desired image on a medium by ejecting ink to the medium as an example of the liquid. Such a liquid ejecting apparatus 1 receives image data transmitted by wired communication or wireless communication from an external device such as a computer provided outside, and forms an image based on the received image data on a medium.

Figure 1A:
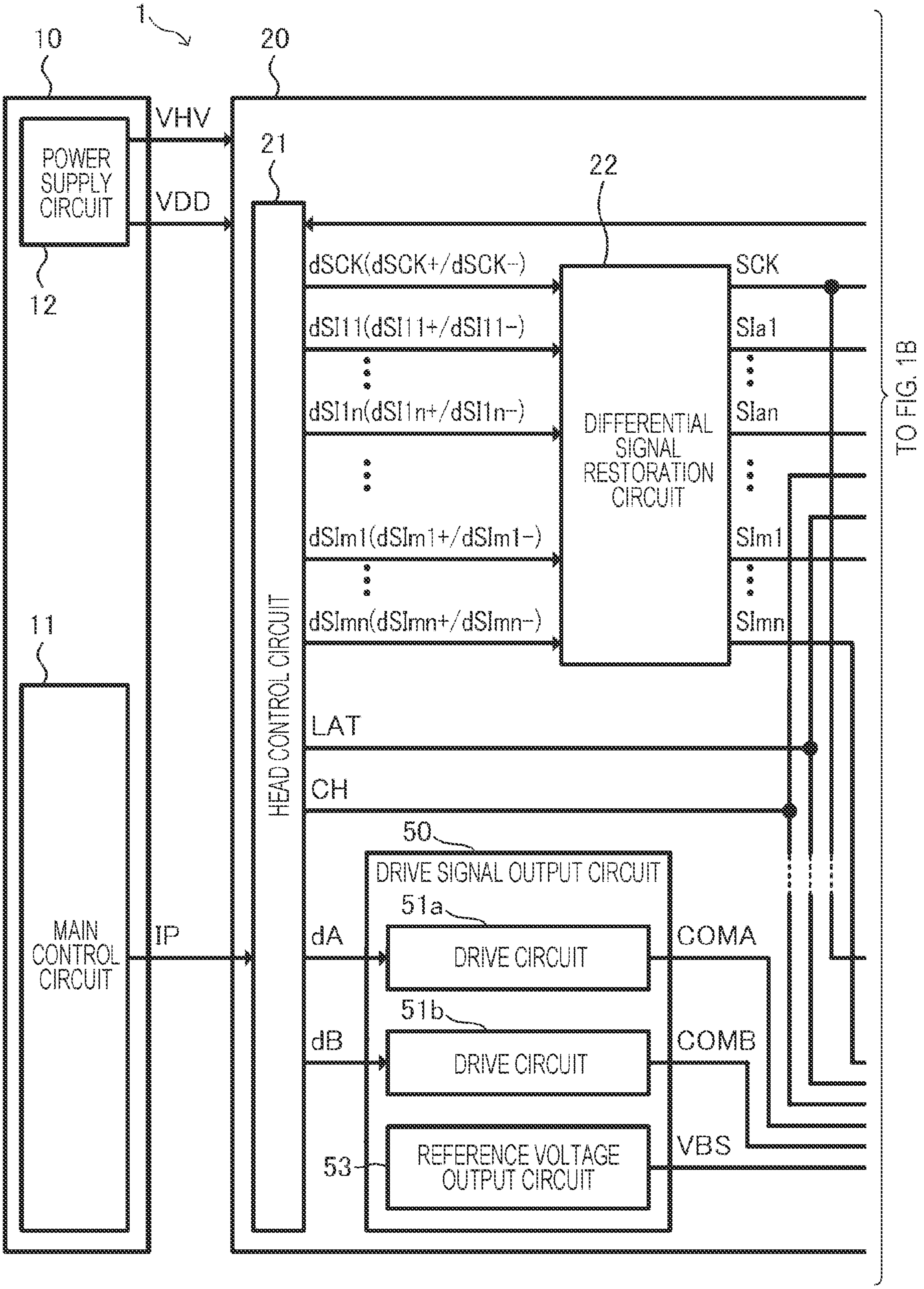
FIGS. 1A and 1B are a diagram showing a functional configuration of a liquid ejecting apparatus.
Figure 1B:
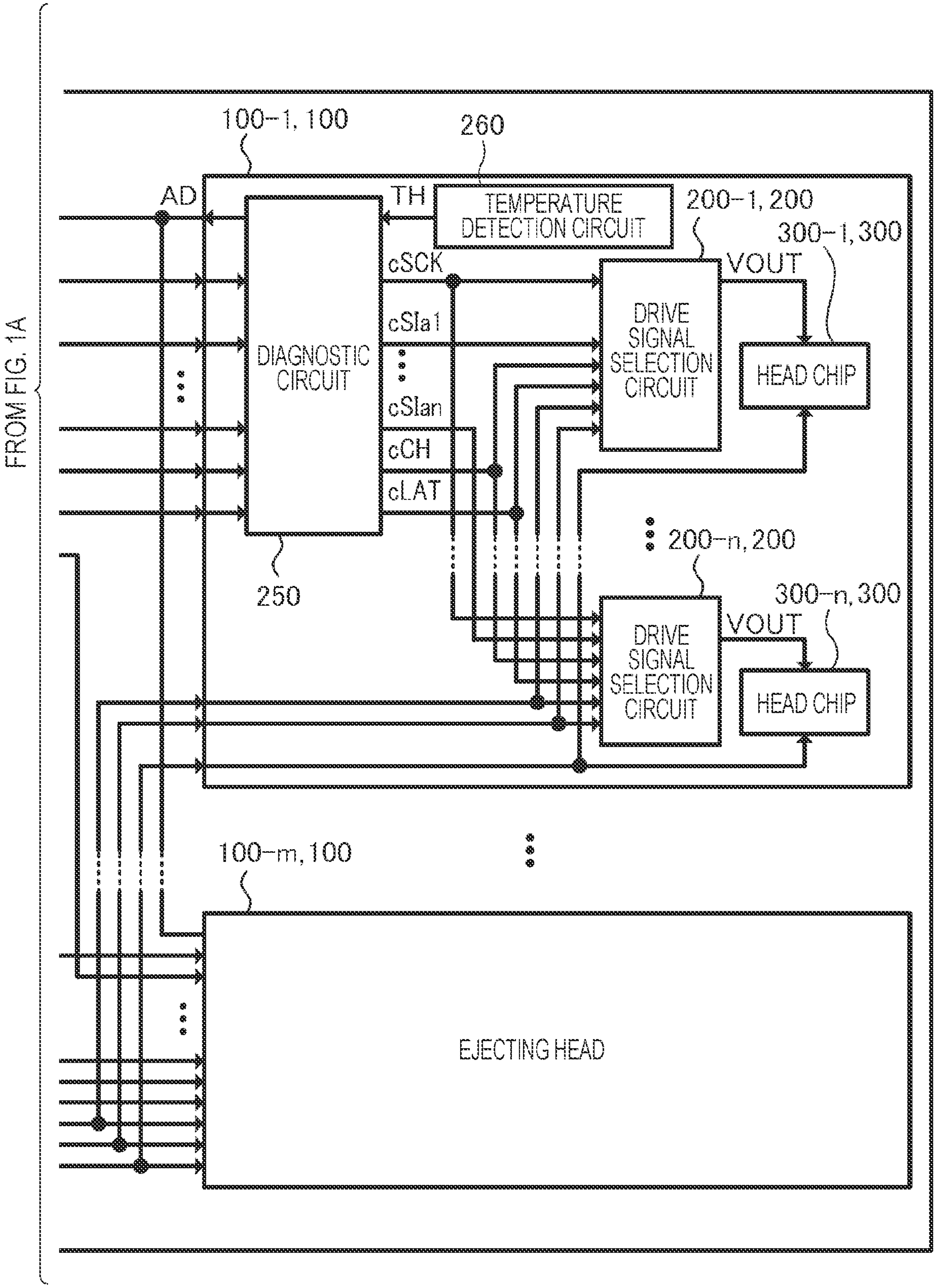

FIGS. 1A and 1B are a diagram showing a functional configuration of the liquid ejecting apparatus 1. As shown in FIGS. 1A and 1B, the liquid ejecting apparatus 1 includes a control unit 10 and a head unit 20.

The control unit 10 has a main control circuit 11 and a power supply circuit 12. A commercial voltage is input to the power supply circuit 12 from a commercial AC power supply (not shown) provided outside the liquid ejecting apparatus 1. Then, the power supply circuit 12 generates a voltage VHV which is a DC voltage having a voltage value of 42 V and a voltage VDD which is a DC voltage having a voltage value of 5 V based on the input commercial voltage, and outputs the voltages to the head unit 20. Such a power supply circuit 12 is configured to include, for example, an AC/DC converter such as a flyback circuit that converts a commercial voltage, which is an AC voltage, into a DC voltage, and a DC/DC converter that converts the voltage value of the DC voltage output by the AC/DC converter.

By supplying the voltages VHV and VDD generated by the power supply circuit 12 to the head unit 20, various components of the head unit 20 operate. That is, the voltages VHV and VDD correspond to the power supply voltage of the head unit 20. The voltages VHV and VDD may also be used as the power supply voltage of each part of the liquid ejecting apparatus 1 including the control unit 10. Further, the power supply circuit 12 generates a voltage signal of the voltage value used in each part of the liquid ejecting apparatus 1 including the control unit 10 and the head unit 20 in addition to the voltages VHV and VDD, and outputs the voltage signals to the corresponding components.

An image signal is input to the main control circuit 11 from an external device such as a host computer provided outside the liquid ejecting apparatus 1 via an interface circuit (not shown). Then, the main control circuit 11 generates various signals for forming an image corresponding to the input image signal on the medium, and outputs the signals to the corresponding components.

Specifically, the main control circuit 11 performs predetermined image processing on the input image signal, and then outputs the image-processed signal to the head unit 20 as an image information signal IP. The image information signal IP output from the main control circuit 11 is an electrical signal such as a differential signal, and is, for example, a signal compliant with a peripheral component interconnect express (PCIe) communication standard. Here, the image processing executed by the main control circuit 11 includes, for example, color conversion processing that converts the input image signal into red, green, and blue color information, and then converts it into color information corresponding to the color of the ink ejected from the liquid ejecting apparatus 1, and halftone processing that binarizes the color information. The image processing executed by the main control circuit 11 is not limited to the color conversion processing and the halftone processing which are described above.

Further, the main control circuit 11 generates a transport control signal for transporting a medium on which an image based on the input image signal is formed based on the image signal, and outputs the transport control signal to a medium transport unit (not shown). As a result, the transport of the medium is started.

As described above, the main control circuit 11 generates the image information signal IP that controls the operation of the head unit 20, and outputs the generated signal to the head unit 20 and also controls the transport of the medium. As a result, the head unit 20 can eject ink to a desired position on the medium. Such a main control circuit 11 is one or a plurality of semiconductor devices having a plurality of functions, and is configured to include, for example, a system on a chip (SoC).

The head unit 20 includes a head control circuit 21, a differential signal restoration circuit 22, a drive signal output circuit 50, and ejecting heads 100-1 to **100-*m*. In the following description, the ejecting heads 100-1 to 100-*m* have the same configuration, and may be referred to as ejecting heads 100** when it is not necessary to distinguish the ejecting heads.

The head control circuit 21 outputs a control signal for controlling each part of the head unit 20 based on the image information signal IP input from the main control circuit 11. Specifically, the head control circuit 21 generates a differential signal dSCK obtained by converting a control signal for controlling ink ejection from the ejecting heads 100 into a differential signal and differential signals dSIa1 to dSIan, . . . , dSIm1 to dSImn, based on the image information signal IP, and outputs the generated differential signals to the differential signal restoration circuit 22.

The differential signal restoration circuit 22 generates a clock signal SCK and print data signals SIa1 to SIan, . . . , SIm1 to SImn by restoring the input differential signal dSCK and each of the differential signals dSIa1 to dSIan, . . . , dSIm1 to dSImn, outputting the generated signals to the corresponding ejecting heads 100-1 to **100-*m***.

Specifically, the head control circuit 21 generates a differential signal dSCK including a pair of signals dSCK+ and dSCK−, and outputs the differential signal dSCK to the differential signal restoration circuit 22. The differential signal restoration circuit 22 generates the clock signal SCK by restoring the differential signal dSCK including the input pair of signals dSCK+ and dSCK−, and outputs the clock signal SCK to the ejecting heads 100-1 to **100-*m***.

Further, the head control circuit 21 generates the differential signals dSIa1 to dSIan including a pair of signals dSIa1+ to dSIan+ and dSIa1− to dSIan−, and outputs the differential signals dSIa1 to dSIan to the differential signal restoration circuit 22. The differential signal restoration circuit 22 generates print data signals SIa1 to SIan, which are corresponding single-ended signals by restoring the input differential signals dSIa1 to dSIan, outputting the print data signals SIa1 to SIan to the ejecting head 100-1.

Similarly, the head control circuit 21 generates the differential signals dSIm1 to dSImn including a pair of signals dSIm1+ to dSImn+ and dSIm1− to dSImn−, and outputs the differential signals dSIm1 to dSImn to the differential signal restoration circuit 22. The differential signal restoration circuit 22 generates print data signals SIm1 to SImn, which are corresponding single-ended signals by restoring the input differential signals dSIm1 to dSImn, outputting the print data signals SIm1 to SImn to the ejecting head **100-*m***.

That is, the clock signal SCK obtained by restoring the differential signal dSCK including the pair of signals dSCK+ and dSCK− output by the head control circuit 21 by the differential signal restoration circuit 22, and the print data signals SIi1 to SIin obtained by restoring the differential signals dSIi1 to dSIin including the pair of signals dSIi1+ to dSIin+ and dSIi1− to dSIin− by the differential signal restoration circuit 22 are input to the ejecting head 100-*i* (i is any one of 1 to m).

Here, the differential signal dSCK and the differential signals dSIa1 to dSIan, . . . , DSIm1 to dSImn output from the head control circuit 21 are each low voltage differential signaling (LVDS) transfer type differential signals, and alternatively, may be differential signals of various high-speed communication methods such as low voltage positive emitter coupled logic (LVPECL) and current mode logic (CML) other than LVDS. Further, the head unit 20 has a differential signal generation circuit that generates a differential signal, and the differential signal generation circuit generates the differential signal dSCK and the differential signals dSIa1 to dSIan, . . . , DSIm1 to dSImn from a basic control signal oSCK that is the basis of the differential signal dSCK output by the head control circuit 21, and basic control signals oSIa1 to oSIan, . . . , oSIm1 to oSImn that are the basis of the differential signals dSIa1 to dSIan, . . . , dSIm1 to dSImn, and outputs generated signals to the differential signal restoration circuit 22.

Further, the head control circuit 21 generates a latch signal LAT and a change signal CH as control signals for controlling the ink ejection timing from m ejecting heads 100 based on the image information signal IP input from the main control circuit 11, and outputs the generated signals to each of the m ejecting heads 100.

Further, the head control circuit 21 generates basic drive signals dA and dB which are the basis of drive signals COMA and COMB for driving the m ejecting heads 100 based on the image information signal IP input from the main control circuit 11, and outputs the generated drive signals to the drive signal output circuit 50.

The drive signal output circuit 50 includes drive circuits 51*a* and 51*b*. The basic drive signal dA is input to the drive circuit 51*a*. Then, the drive circuit 51*a* generates the drive signal COMA by converting the input basic drive signal dA into an analog signal and then amplifying the converted analog signal to class D based on the voltage VHV, and outputs the generated drive signal to the m ejecting heads 100. The basic drive signal dB is input to the drive circuit 51*b*. Then, the drive circuit 51*b* generates the drive signal COMB by converting the input basic drive signal dB into an analog signal and then amplifying the converted analog signal to class D based on the voltage VHV, and outputs the generated drive signal to the m ejecting heads 100. Further, the drive signal output circuit 50 generates a reference voltage signal VBS which is a reference potential when ink is ejected from the m ejecting heads 100 by stepping up or stepping down the voltage VDD, and outputs the generated reference voltage signal to the m ejecting heads 100.

Here, in the present embodiment, the drive signals COMA and COMB, and the reference voltage signal VBS output by the drive signal output circuit 50 have been described as being commonly output to the m ejecting heads 100; however, the drive signal output circuit 50 may include a plurality of drive circuits 51*a* and 51*b*, and may output a plurality of drive signals COMA and COMB corresponding to the m ejecting heads 100. Further, the drive circuits 51*a* and 51*b* need only be able to amplify analog signals corresponding to the input basic drive signals dA and dB based on the voltage VHV; for example, the drive circuits 51*a* and 51*b* may be configured to include a class A amplifier circuit, a class B amplifier circuit, or a class AB amplifier circuit.

The print data signals SIa1 to SIan, the clock signal SCK, the latch signal LAT, the change signal CH, the drive signal COMA and COMB, and the reference voltage signal VBS are input to the ejecting head 100-1. Further, the ejecting head 100-1 has a diagnostic circuit 250, a temperature detection circuit 260, drive signal selection circuits 200-1 to 200-*n*, and head chips 300-1 to 300-*n* corresponding to the drive signal selection circuits 200-1 to 200-*n*, respectively.

The temperature detection circuit 260 included in the ejecting head 100-1 detects the temperature of the ejecting head 100-1 and outputs a temperature information signal TH indicating the detected temperature. The temperature information signal TH output by the temperature detection circuit 260 may include information indicating the temperature of the ejecting head 100-1, and may include information indicating whether or not the temperature of the ejecting head 100-1 is equal to or higher than a predetermined temperature. Then, the temperature information signal TH output by the temperature detection circuit 260 is input to the diagnostic circuit 250.

The diagnostic circuit 250 included in the ejecting head 100-1 detects the presence or absence of an abnormality in the ejecting head 100-1, generates an abnormality detection signal AD indicating the detection result, and outputs the abnormality detection signal AD to the head control circuit 21.

The diagnostic circuit 250 determines whether or not the temperature of the ejecting head 100-1 is normal based on the temperature information signal TH input from the temperature detection circuit 260. That is, the diagnostic circuit 250 detects the presence or absence of a temperature abnormality in the ejecting head 100-1. Then, the diagnostic circuit 250 generates the abnormality detection signal AD indicating the presence or absence of the temperature abnormality, and outputs the abnormality detection signal AD to the head control circuit 21.

Further, the print data signals SIa1 to SIan, the clock signal SCK, the latch signal LAT, and the change signal CH are input to the diagnostic circuit 250. Then, the diagnostic circuit 250 detects the presence or absence of the operation abnormality in the ejecting head 100-1 based on the logic levels of the input print data signals SIa1 to SIan, the clock signal SCK, the latch signal LAT, and the change signal CH. Then, the diagnostic circuit 250 generates the abnormality detection signal AD indicating the presence or absence of the operation abnormality, and outputs the abnormality detection signal AD to the head control circuit 21.

For example, the diagnostic circuit 250 may detect the presence or absence of the operation abnormality caused by the abnormality in the propagation paths of the input print data signals SIa1 to SIan, the clock signal SCK, the latch signal LAT, and the change signal CH, based on whether or not the logic levels of the input print data signals SIa1 to SIan, the clock signal SCK, the latch signal LAT, and the change signal CH are normal logic. Further, the diagnostic circuit 250 may cause the ejecting head 100-1 to execute a predetermined operation based on the logic levels of the print data signals SIa1 to SIan, the clock signal SCK, the latch signal LAT, and the change signal CH, and may detect the presence or absence of the operation abnormality in the ejecting head 100-1 depending on whether or not the predetermined operation is normally executed.

Further, the diagnostic circuit 250 detects whether or not the ink mist that enters into the ejecting head 100-1 adheres to the inside of the ejecting head 100-1. Then, the diagnostic circuit 250 generates the abnormality detection signal AD indicating the presence or absence of the adhesion of ink mist, and outputs the abnormality detection signal AD to the head control circuit 21.

Then, when it is determined that no abnormality occurs in the ejecting head 100-1, the diagnostic circuit 250 outputs the clock signal SCK as the clock signal cSCK to the drive signal selection circuits 200-1 to 200-*n*, outputs the print data signals SIa1 to SIan as the print data signals cSIa1 to cSIan to the corresponding drive signal selection circuits 200-1 to 200-*n*, respectively, outputs the latch signal LAT as the latch signal cLAT to the drive signal selection circuits 200-1 to 200-*n*, and outputs the change signal CH as the change signal cCH to the drive signal selection circuits 200-1 to 200-*n*.

Here, the clock signal SCK and the clock signal cSCK output by the diagnostic circuit 250 may be the same signal, and similarly, the print data signals SIa1 to SIan and their respective print data signals cSIa1 to cSIan, the latch signal LAT and the latch signal cLAT, and the change signal CH and the change signal cCH may be the same signal. Further, the diagnostic circuit 250 may output the clock signal cSCK obtained by converting the clock signal SCK, and similarly, may output the print data signals cSIa1 to cSIan obtained by converting the print data signals SIa1 to SIan, respectively, the latch signal cLAT obtained by converting the latch signal LAT, and the change signal cCH obtained by converting the change signal CH. In the liquid ejecting apparatus 1 of the present embodiment, it will be described that the clock signal SCK and the clock signal cSCK output by the diagnostic circuit 250 are the same signals, and the print data signals SIa1 to SIan and their respective print data signals cSIa1 to cSIan are the same signals, the latch signal LAT and the latch signal cLAT are the same signals, and the change signal CH and the change signal cCH are the same signals.

Further, the diagnostic circuit 250 may output, to the head control circuit 21, the abnormality detection signal AD including a command indicating information indicating whether or not an abnormality occurs in the ejecting head 100, whether the abnormality is a temperature abnormality or operation abnormality when the abnormality occurs in the ejecting head 100, or whether or not ink mist adheres to the ejecting head 100; however, it is preferable that the diagnostic circuit 250 outputs, to the head control circuit 21, a high-level or low-level abnormality detection signal AD indicating whether or not the temperature abnormality, the operation abnormality, and the adherence of ink mist occurs in the ejecting head 100. That is, it is preferable that the diagnostic circuit 250 outputs a low-level or high-level abnormality detection signal AD when an abnormality occurs in the ejecting head 100.

In this way, the head control circuit 21 can detect the presence or absence of an abnormality in the ejecting heads 100 and stop the printing process in the ejecting head 100 in a short time without analyzing a command, and as a result, the possibility that the abnormality generated in the ejecting heads 100 spreads to each part of the liquid ejecting apparatus 1 is reduced.

The print data signal cSIa1, the clock signal cSCK, the latch signal cLAT, the change signal cCH, and the drive signals COMA and COMB are input to the drive signal selection circuit 200-1 included in the ejecting head 100-1. Then, the drive signal selection circuit 200-1 included in the ejecting head 100-1 generates a drive signal VOUT by selecting or not selecting waveforms included in the drive signals COMA and COMB at the timing defined by the latch signal cLAT and the change signal cCH based on the print data signal cSIa1, and output the generated drive signal to the head chip 300-1 included in the ejecting head 100-1. In this way, a piezoelectric element 60 in the head chip 300-1, which will be described later, is driven, and ink is ejected from the corresponding nozzle as the piezoelectric element 60 is driven.

Similarly, the print data signal cSIan, the clock signal cSCK, the latch signal cLAT, the change signal cCH, and the drive signals COMA and COMB are input to the drive signal selection circuit 200-*n* included in the ejecting head 100-1. Then, the drive signal selection circuit 200-*n* included in the ejecting head 100-1 generates a drive signal VOUT by selecting or not selecting waveforms included in the drive signals COMA and COMB at the timing defined by the latch signal cLAT and the change signal cCH based on the print data signal cSIan, and output the generated drive signal to the head chip 300-*n* included in the ejecting head 100-1. In this way, a piezoelectric element 60 in the head chip 300-*n*, which will be described later, is driven, and ink is ejected from the corresponding nozzle as the piezoelectric element 60 is driven.

That is, each of the drive signal selection circuits 200-1 to 200-*n* performs switching regarding whether or not to supply the drive signals COMA and COMB as the drive signal VOUT to the piezoelectric element 60 included in the corresponding head chips 300-1 to 300-*n*. Here, the ejecting head 100-1 and the ejecting heads 100-2 to 100-*m* differ only in the input signal, and the configuration and operation are the same. Therefore, the description of the configuration and operation of the ejecting heads 100-2 to 100-*m* will be omitted. Further, in the following description, the drive signal selection circuits 200-1 to 200-*n* included in the ejecting heads 100 all have the same configuration, and the head chips 300-1 to 300-*n* all have the same configuration. For that reason, when it is not necessary to distinguish the drive signal selection circuits 200-1 to 200-*n*, it may be simply referred to as a drive signal selection circuit 200, and when it is not necessary to distinguish the head chips 300-1 to 300-*n*, it may be simply referred to as a head chip 300. In this case, it will be described that the drive signal selection circuit 200 and the head chip 300 correspond to each other, and the drive signal selection circuit 200 outputs the drive signal VOUT to the head chip 300. In this case, it will be described that the print data signal cSI, the clock signal cSCK, the latch signal cLAT, the change signal cCH, and the drive signals COMA and COMB are input to the drive signal selection circuit 200.

In the liquid ejecting apparatus 1 configured as described above, the ejecting heads 100 that eject ink to the medium are an example of a print head, and one of the differential signal restoration circuit 22 that outputs print data signals SIa1 to SIan and the clock signal SCK, which are digital signals, and the head control circuit 21 that outputs the latch signal LAT and change signal CH, which are digital signals, to the ejecting heads 100 is an example of a digital signal output circuit. In the present embodiment, the head control circuit 21 is described as outputting the differential signals dSIa1 to dSIan, which are the basis of the print data signals SIa1 to SIan, and the differential signal dSCK, which is the basis of the clock signal SCK, but the head control circuit 21 may output the single-ended print data signals SIa1 to SIan and the clock signal SCK. In this case, the liquid ejecting apparatus 1 may not include the differential signal restoration circuit 22.

2. Configuration and Operation of Drive Signal Selection Circuit

Next, the configuration and operation of the drive signal selection circuit 200 will be described. As described above, the drive signal selection circuit 200 generates the drive signal VOUT by selecting or not selecting waveforms of the input drive signals COMA and COMB, and outputs the drive signal VOUT to the corresponding head chip 300. Therefore, in describing the configuration and operation of the drive signal selection circuit 200, first, an example of waveforms of the drive signals COMA and COMB input to the drive signal selection circuit 200, and an example of a waveform of the drive signal VOUT output by the drive signal selection circuit 200 will be described.

Figure 2:
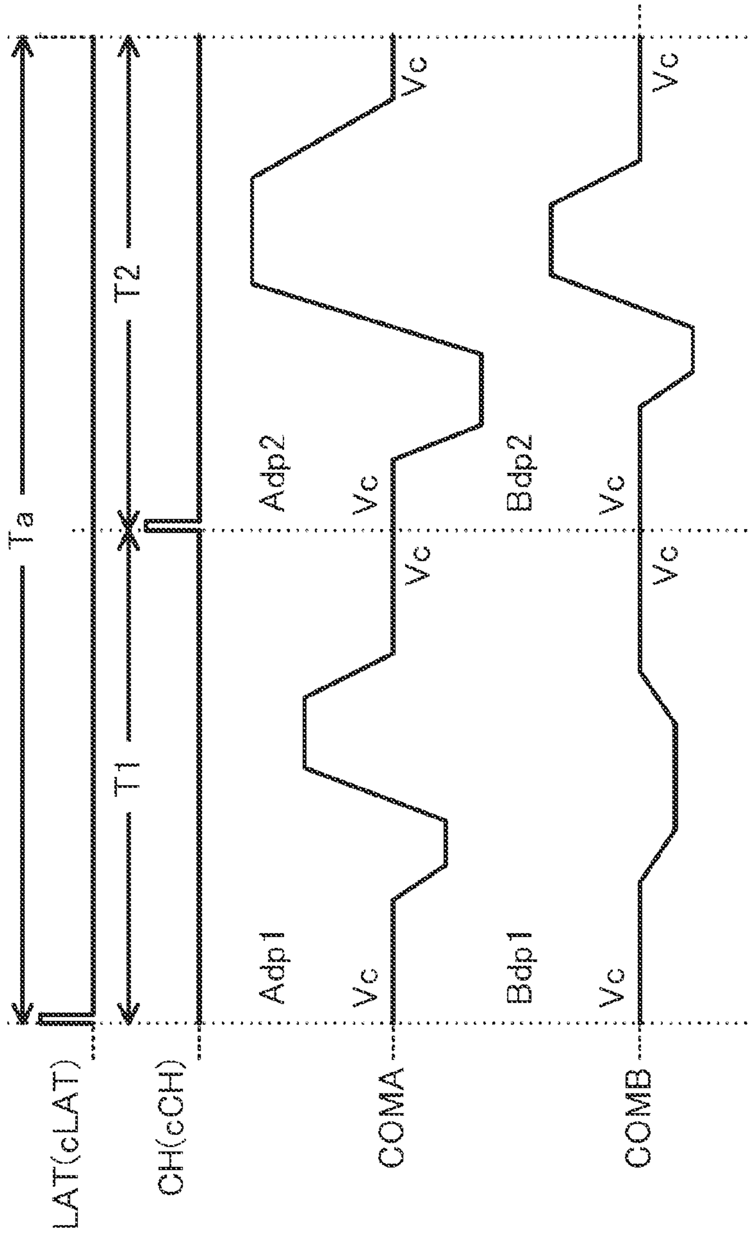
FIG. 2 is a diagram showing an example of waveforms of drive signals.

FIG. 2 is a diagram showing an example of waveforms of the drive signals COMA and COMB. As shown in FIG. 2, the drive signal COMA is a waveform in which the trapezoidal waveform Adp1 arranged in T1 during a period from the rise of the latch signal LAT to the rise of the change signal CH and a trapezoidal waveform Adp2 arranged in T2 during a period from the rise of the change signal CH to the rise of the latch signal LAT are continuous. When the trapezoidal waveform Adp1 is supplied to the head chip 300, a small amount of ink is ejected from the corresponding nozzle of the head chip 300, and when the trapezoidal waveform Adp2 is supplied to the head chip 300, a medium amount of ink, more than the small amount, is ejected from the corresponding nozzle of the head chip 300.

Further, as shown in FIG. 2, the drive signal COMB is a waveform in which the trapezoidal waveform Bdp1 arranged in the period T1 and the trapezoidal waveform Bdp2 arranged in the period T2 are continuous. When the trapezoidal waveform Bdp1 is supplied to the head chip 300, ink is not ejected from the corresponding nozzle of the head chip 300. This trapezoidal waveform Bdp1 is a waveform for slightly vibrating the ink in the vicinity of the opening of the nozzle to prevent an increase in ink viscosity. Further, when the trapezoidal waveform Bdp2 is supplied to the head chip 300, a small amount of ink is ejected from the corresponding nozzle of the head chip 300, as when the trapezoidal waveform Adp1 is supplied.

Here, as shown in FIG. 2, voltage values at the start timing and end timing of trapezoidal waveforms Adp1, Adp2, Bdp1, and Bdp2 are all common to a voltage Vc. That is, the trapezoidal waveforms Adp1, Adp2, Bdp1, and Bdp2 are each waveforms that start at the voltage Vc and end at the voltage Vc. Then, a period Ta including the period T1 and the period T2 corresponds to a printing cycle for forming new dots on the medium.

Although the trapezoidal waveform Adp1 and the trapezoidal waveform Bdp2 are shown in FIG. 2 as having the same waveform, the trapezoidal waveform Adp1 and the trapezoidal waveform Bdp2 may have different waveforms. Further, it will be described that a small amount of ink is ejected from the corresponding nozzles in both the case where the trapezoidal waveform Adp1 is supplied to the head chip 300 and the case where the trapezoidal waveform Bdp1 is supplied to the head chip 300; however, the present disclosure is not limited thereto. That is, the waveforms of the drive signals COMA and COMB are not limited to the example shown in FIG. 2, and signals with various waveform combinations may be used depending on the properties of the ink ejected from the nozzle of the head chip 300, the material of the medium on which the ink lands, and the like.

The drive signals COMA and COMB output by the drive signal output circuit 50 as described above are signals having voltage values larger than that of the print data signal SI, the latch signal LAT, the change signal CH, and the clock signal SCK, and include trapezoidal waveforms Adp1, Adp2, Bdp1, and Bdp2 amplified based on the voltage VHV of a high potential. At least one of the drive signals COMA and COMB is an example of a trapezoidal waveform signal, and at least one of the drive circuits 51*a* and 51*b* that outputs the drive signals COMA and COMB and the drive signal output circuit 50 including the drive circuits 51*a* and 51*b* is an example of a trapezoidal waveform signal output circuit.

Figure 3:
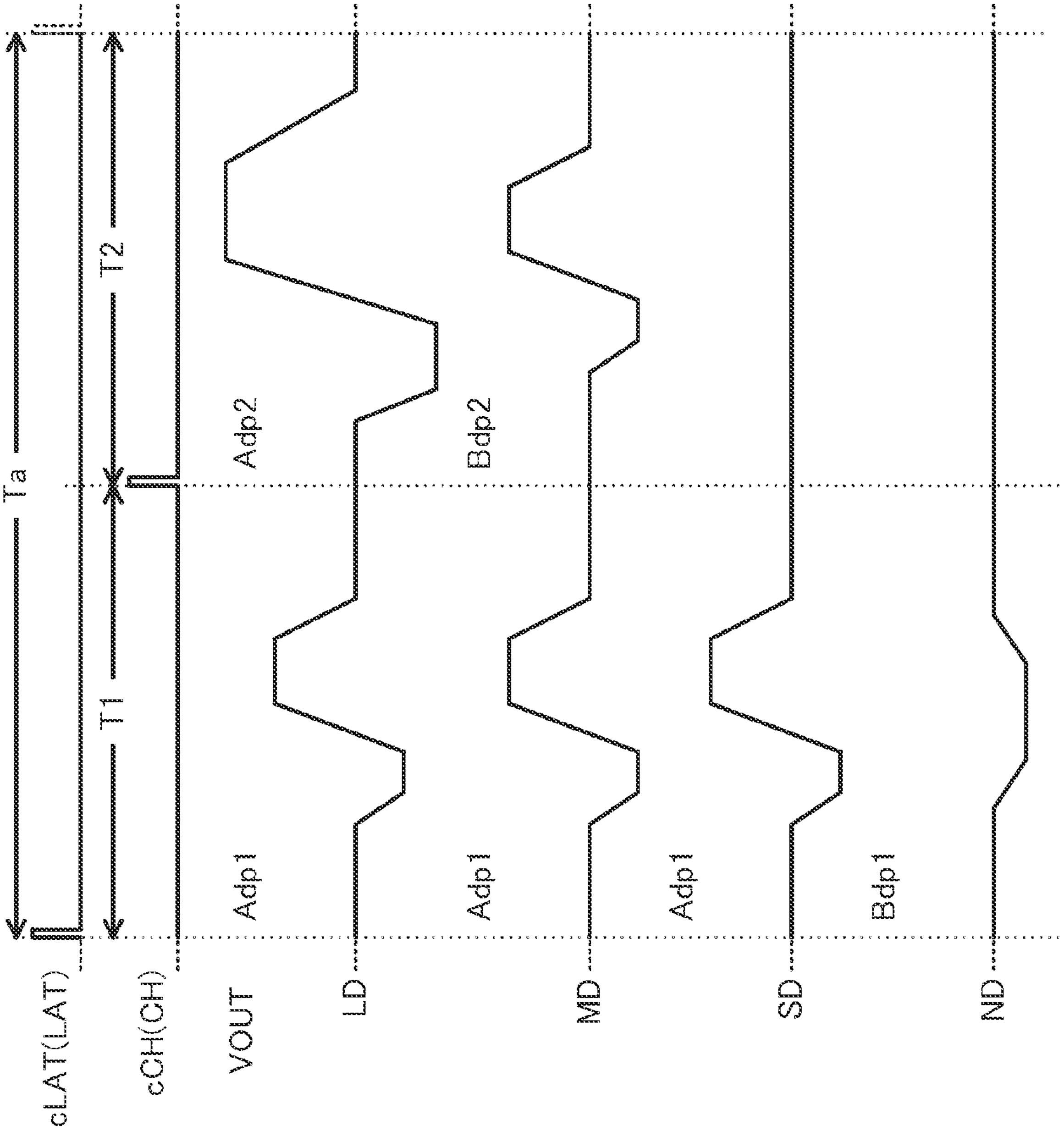
FIG. 3 is a diagram showing an example of a waveform of a drive signal.

FIG. 3 is a diagram showing an example of the waveform of the drive signal VOUT in which the size of dots formed on the medium correspond to each of a large dot LD, a medium dot MD, a small dot SD, and a non-recording ND.

As shown in FIG. 3, the drive signal VOUT when the large dot LD is formed on the medium is a waveform in which the trapezoidal waveform Adp1 arranged in the period T1 and the trapezoidal waveform Adp2 arranged in the period T2 are continuous in the period Ta. When the drive signal VOUT is supplied to the head chip 300, a small amount of ink and a medium amount of ink are ejected from the corresponding nozzles. Therefore, in the period Ta, ink from each nozzle lands on the medium and coalesces, so that the large dot LD is formed on the medium.

Further, the drive signal VOUT when the medium dot MD is formed on the medium is a waveform in which the trapezoidal waveform Adp1 arranged in the period T1 and the trapezoidal waveform Bdp2 arranged in the period T2 are continuous in the period Ta. When the drive signal VOUT is supplied to the head chip 300, a small amount of ink is ejected twice from the corresponding nozzle. Therefore, in the period Ta, ink from each nozzle lands on the medium and coalesces, so that the medium dot MD is formed on the medium.

The drive signal VOUT when the small dot SD is formed on the medium is a waveform in which the trapezoidal waveform Adp1 arranged in the period T1 and a constant waveform with a voltage Vc arranged in the period T2 are continuous in the period Ta. When the drive signal VOUT is supplied to the head chip 300, a small amount of ink is ejected once from the corresponding nozzle. Therefore, in the period Ta, the ink lands on the medium, and the small dot SD is formed on the medium.

The drive signal VOUT corresponding to the non-recording ND that does not form dots on the medium is a waveform in which the trapezoidal waveform Bdp1 arranged in the period T1 and the constant waveform with the voltage Vc arranged in the period T2 are continuous in the period Ta. When the drive signal VOUT is supplied to head chips 300, the ink in the vicinity of the opening of the corresponding nozzle only vibrates slightly, and the ink is not ejected. Therefore, in the period Ta, the ink does not land on the medium and dots are not formed on the medium.

Here, the constant waveform with the voltage Vc refers to a voltage supplied to the head chip 300 when none of the trapezoidal waveforms Adp1, Adp2, Bdp1, and Bdp2 is selected as the drive signal VOUT, and specifically, refer to a waveform of a voltage value in which the voltage Vc immediately before the trapezoidal waveforms Adp1, Adp2, Bdp1, and Bdp2 is held in the head chip 300. For this reason, when none of the trapezoidal waveforms Adp1, Adp2, Bdp1, and Bdp2 is selected as the drive signal VOUT, the voltage Vc is supplied to the head chip 300 as the drive signal VOUT.

Figure 4:
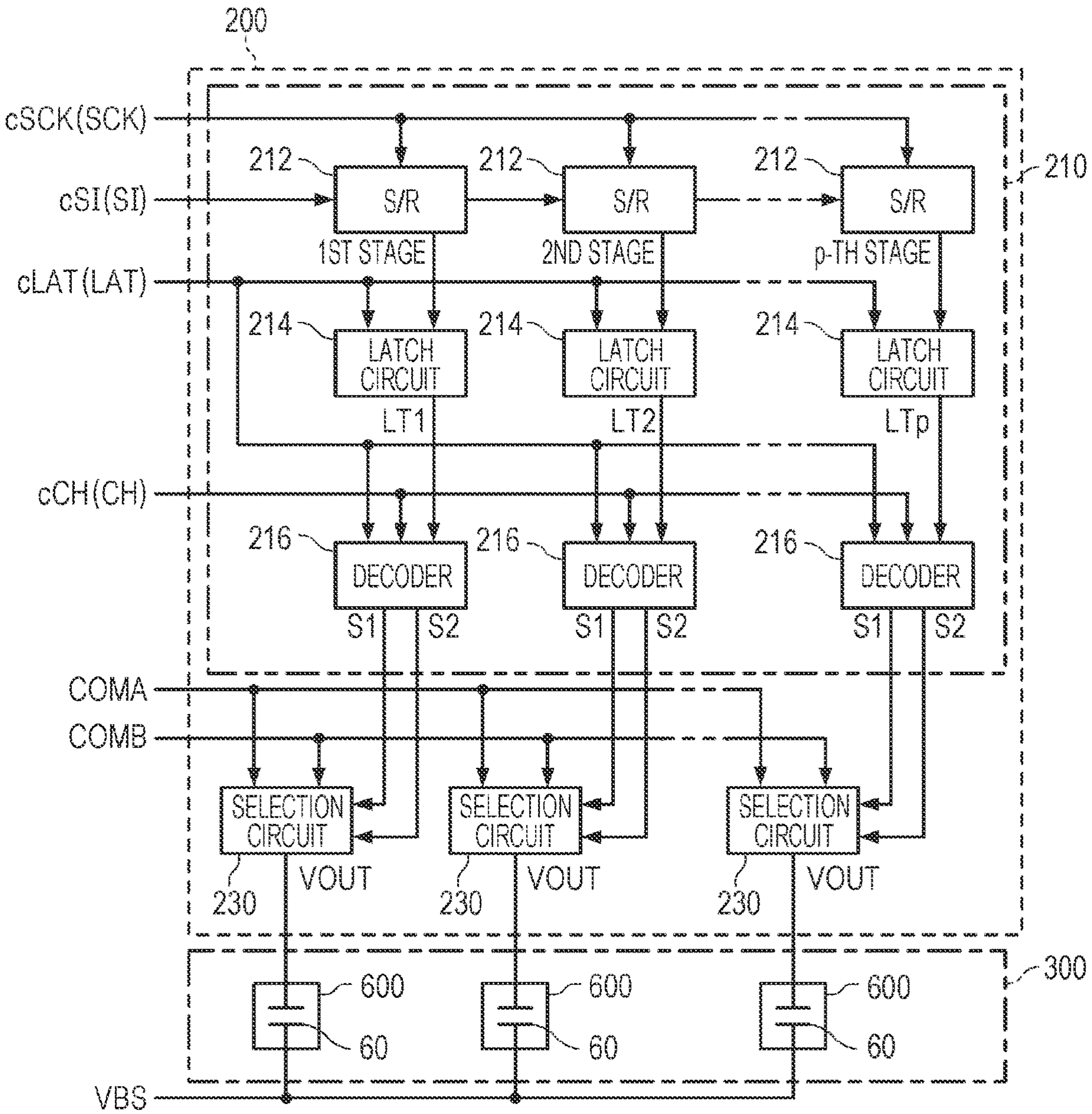
FIG. 4 is a diagram showing a configuration of a drive signal selection circuit.

Next, the configuration and operation of the drive signal selection circuit 200 will be described. FIG. 4 is a diagram showing the configuration of the drive signal selection circuit 200. As shown in FIG. 4, the drive signal selection circuit 200 includes a selection control circuit 210 and a plurality of selection circuits 230. Further, FIG. 4 shows an example of the head chip 300 to which the drive signal VOUT output from the drive signal selection circuit 200 is supplied. As shown in FIG. 4, the head chip 300 includes p ejecting portions 600 each having the piezoelectric element 60.

The print data signal cSI, the latch signal cLAT, the change signal cCH, and the clock signal cSCK are input to the selection control circuit 210. Further, the selection control circuit 210 is provided with sets of a shift register (S/R) 212, a latch circuit 214, and a decoder 216 corresponding to the p ejecting portions 600 of the head chip 300, respectively. That is, the drive signal selection circuit 200 includes the same number of sets of the shift register 212, the latch circuit 214, and the decoder 216 as the p ejecting portions 600 of the head chip 300.

The print data signal cSI is a signal synchronized with the clock signal cSCK, a signal of total of 2p bits that includes a 2-bit print data [SIH, SIL] for selecting one of the large dot LD, the medium dot MD, the small dot SD, and non-recording ND for each of the p ejecting portions 600. The print data signal cSI input to the drive signal selection circuit 200 corresponds to the p ejecting portions 600, and is held in the shift register 212 for each of the two bits of print data [SIH, SIL] included in the print data signal cSI. Specifically, in the selection control circuit 210, the p-stage shift registers 212 corresponding to the p ejecting portions 600 are coupled in cascade to each other, and the print data [SIH, SIL] serially input as the print data signal cSI is sequentially transferred to the subsequent stage with the clock signal cSCK. In FIG. 4, in order to distinguish the shift registers 212, the shift register 212 into which the print data signal cSI is input is described as 1st stage, 2nd stage, . . . , p-th stage in order from upstream to downstream.

Each of the p latch circuits 214 latches the 2-bit print data [SIH, SIL] held in each of the p shift registers 212 at the rise of the latch signal cLAT.

Figures 5, 6:
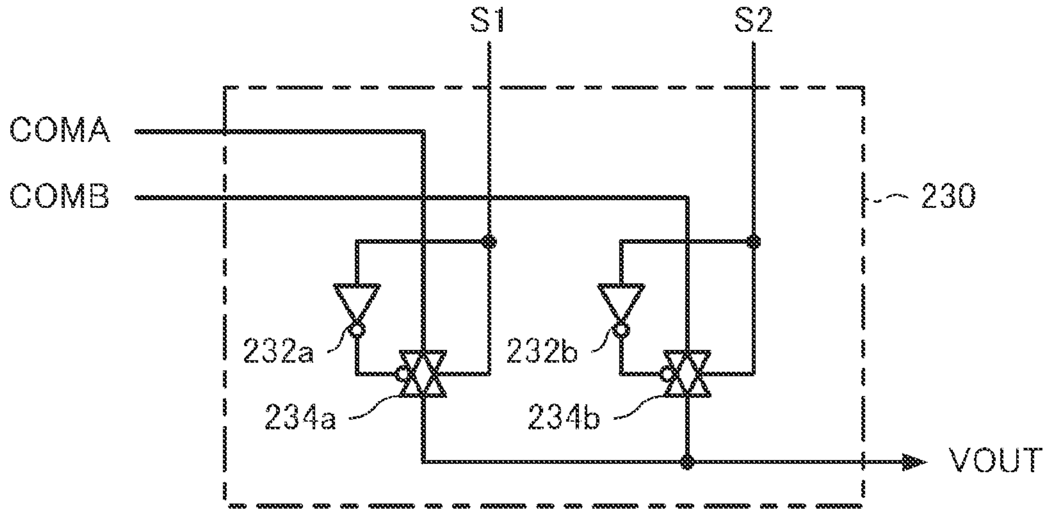
FIG. 5 is a diagram showing decoding contents in a decoder.
FIG. 6 is a diagram showing a configuration of a selection circuit.

FIG. 5 is a diagram showing the decoding contents in the decoder 216. The decoder 216 outputs selection signals S1 and S2 according to the latched 2-bit print data [SIH, SIL]. For example, when the 2-bit print data [SIH, SIL] is [1,0], the decoder 216 outputs logic levels of the selection signal S1 to the selection circuit 230 as H and L levels in the periods T1 and T2, and outputs logic levels of the selection signal S2 to the selection circuit 230 as L and H levels in the periods T1 and T2.

The selection circuit 230 is provided corresponding to each of the ejecting portions 600. That is, the number of selection circuits 230 included in the drive signal selection circuit 200 is p, which is the same as the number of ejecting portions 600 included in the corresponding head chip 300. FIG. 6 is a diagram showing a configuration of the selection circuit 230 corresponding to one ejecting portion 600. As shown in FIG. 6, the selection circuit 230 has inverters 232*a* and 232*b*, which are NOT circuits, and transfer gates 234*a* and 234*b*.

The selection signal S1 is input to a positive control terminal of the transfer gate 234*a* to which a circle is not attached, and meanwhile, is also logically inverted by the inverter 232*a* and input to a negative control terminal of the transfer gate 234*a* to which a circle is attached. Further, the drive signal COMA is supplied to an input terminal of the transfer gate 234*a*. The selection signal S2 is input to a positive control terminal of the transfer gate 234*b* to which a circle is not attached, and meanwhile, is also logically inverted by the inverter 232*b* and input to a negative control terminal of the transfer gate 234*b* to which a circle is attached. Further, the drive signal COMB is supplied to the input terminal of the transfer gate 234*b*. Then, the output terminals of the transfer gates 234*a* and 234*b* are commonly coupled, and the drive signal VOUT is output from the output terminals.

Specifically, the transfer gate 234*a* makes conduction between the input terminal and the output terminal when the selection signal S1 is the H level, and does not make conduction between the input terminal and the output terminal when the selection signal S1 is the L level. Further, the transfer gate 234*b* makes conduction between the input terminal and the output terminal when the selection signal S2 is the H level, and does not make conduction between the input terminal and the output terminal when the selection signal S2 is the L level. That is, the selection circuit 230 selects the waveforms of the drive signals COMA and COMB based on the input selection signals S1 and S2, and outputs the drive signal VOUT of the selected waveform.

Figure 7:
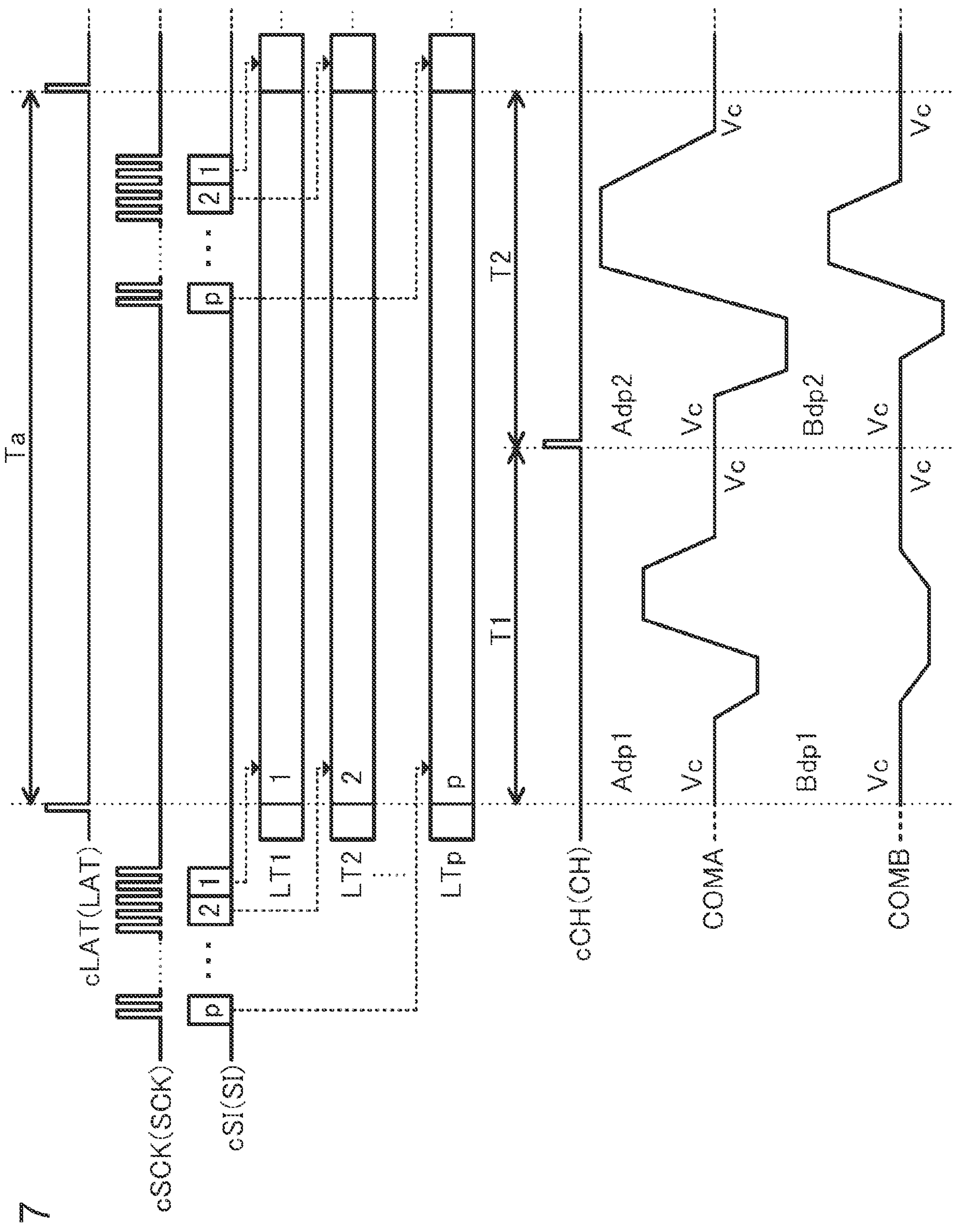
FIG. 7 is a diagram for describing the operation of the drive signal selection circuit.

The operation of the drive signal selection circuit 200 will be described with reference to FIG. 7. FIG. 7 is a diagram for describing the operation of the drive signal selection circuit 200. The print data [SIH, SIL] included in the print data signal cSI is serially input in synchronization with the clock signal cSCK, and is sequentially transferred in the shift register 212 corresponding to the ejecting portion 600. Then, when the input of the clock signal cSCK is stopped, the 2-bit print data [SIH, SIL] corresponding to each of the p ejecting portions 600 is held in each shift register 212. The print data [SIH, SIL] included in the print data signal cSI is input to the ejecting portions 600 of the p-th stage, . . . , 2nd stage, and 1st stage shift register 212 in the corresponding order.

Then, when the latch signal cLAT rises, each of the latch circuits 214 latches the 2-bit print data [SIH, SIL] held in the shift registers 212 all at once. In FIG. 7, LT1, LT2, . . . , LTp indicates 2-bit print data [SIH, SIL] latched by the latch circuits 214 corresponding to the 1st stage, 2nd stage, . . . , p-th stage shift registers 212.

The decoder 216 outputs the logic levels of the selection signals S1 and S2 as shown in FIG. 5 in each of the periods T1 and T2 according to the dot size defined by the latched 2-bit print data [SIH, SIL].

Specifically, when the input print data [SIH, SIL] is [1, 1], the decoder 216 sets the selection signal S1 to the H and H levels in the period T1 and T2, and sets the selection signal S2 to the L and L levels in the periods T1 and T2. In this case, the selection circuit 230 selects the trapezoidal waveform Adp1 in the period T1 and selects the trapezoidal waveform Adp2 in the period T2. As a result, the drive signal VOUT corresponding to the large dot LD shown in FIG. 3 is generated.

Further, when the input print data [SIH, SIL] is [1, 0], the decoder 216 sets the selection signal S1 to the H and L levels in the period T1 and T2, and sets the selection signal S2 to the L and H levels in the periods T1 and T2. In this case, the selection circuit 230 selects the trapezoidal waveform Adp1 in the period T1 and selects the trapezoidal waveform Bdp2 in the period T2. As a result, the drive signal VOUT corresponding to the medium dot MD shown in FIG. 3 is generated.

Further, when the input print data [SIH, SIL] is [0, 1], the decoder 216 sets the selection signal S1 to the H and L levels in the period T1 and T2, and sets the selection signal S2 to the L and L levels in the periods T1 and T2. In this case, the selection circuit 230 selects the trapezoidal waveform Adp1 in the period T1 and does not select either the trapezoidal waveform Adp2 or Bdp2 in the period T2. As a result, the drive signal VOUT corresponding to the small dot SD shown in FIG. 3 is generated.

Further, when the input print data [SIH, SIL] is [0, 0], the decoder 216 sets the selection signal S1 to the L and L levels in the period T1 and T2, and sets the selection signal S2 to the H and L levels in the periods T1 and T2. In this case, the selection circuit 230 selects the trapezoidal waveform Bdp1 in the period T1 and does not select either the trapezoidal waveform Adp2 or Bdp2 in the period T2. As a result, the drive signal VOUT corresponding to the non-recording ND shown in FIG. 3 is generated.

As described above, the drive signal selection circuit 200 selects the waveforms of the drive signals COMA and COMB based on the print data signal cSI, the latch signal cLAT, the change signal cCH, and the clock signal cSCK, and outputs the selected waveforms as the drive signal VOUT. Then, the drive signal selection circuit 200 selects or does not select the waveforms of the drive signals COMA and COMB, so that the size of the dots formed on the medium is controlled, and as a result, dots of a desired size are formed on the medium in the liquid ejecting apparatus 1.

Here, at least one of the print data signal SI, which is a digital signal input to the ejecting heads 100 corresponding to the print data signal cSI, the latch signal LAT, which is a digital signal input to the ejecting heads 100 corresponding to the latch signal cLAT, and the change signal CH, which is a digital signal input to the ejecting heads 100 corresponding to the change signal cCH, is an example of a signal that defines the ink ejection timing. That is, the digital signal output by the head control circuit 21 and input to the diagnostic circuit 250 includes a signal defining the ink ejection timing and the clock signal SCK.

3. Structure of Liquid Ejecting Apparatus

Figure 8:
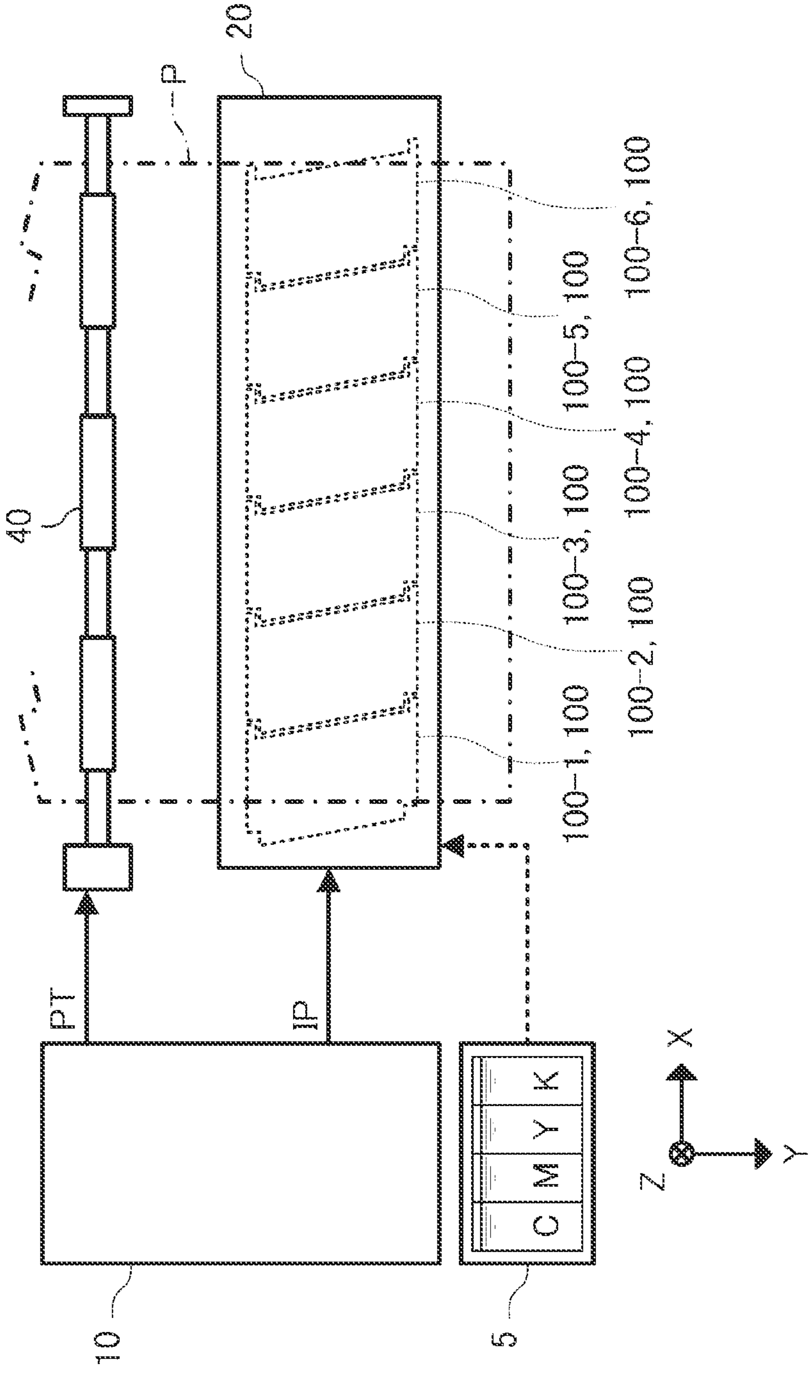
FIG. 8 is a diagram showing a schematic structure of the liquid ejecting apparatus.

Next, a schematic structure of the liquid ejecting apparatus 1 will be described. FIG. 8 is a diagram showing a schematic structure of the liquid ejecting apparatus 1. Here, in the following description, it is assumed that the head unit 20 has six ejecting heads 100. In this case, the six ejecting heads 100 may be referred to as ejecting heads 100-1 to 100-6. Further, the following description will be given by using a Y direction corresponding to a transport direction in which a medium P is transported, an X direction orthogonal to the Y direction and parallel to a horizontal plane and corresponding to a main scanning direction, and a Z direction that is an up-and-down direction of the liquid ejecting apparatus 1 and corresponds to the vertical direction when the liquid ejecting apparatus 1 is installed. In the following description, when the respective directions of the X direction, the Y direction, and the Z direction are specified, the tip side of an arrow indicating the X direction shown may be referred to as a +X side, and the starting point side is referred to as a −X side, the tip side of an arrow indicating the Y direction shown may be referred to as a +Y side, and the starting point side is referred to as a −Y side, and the tip side of an arrow indicating the Z direction shown may be referred to as a +Z side, and the starting point side may be referred to as a −Z side. In the following description, it is assumed that the X direction, the Y direction, and the Z direction are orthogonal to each other, but the present disclosure is not limited to the case where configurations of the liquid ejecting apparatus 1 are arranged orthogonally to each other.

As shown in FIG. 8, the liquid ejecting apparatus 1 includes, in addition to the control unit 10 and the head unit 20 described above, a transport unit 40 for transporting the medium P, and a liquid container 5 for storing ink.

As described above, the control unit 10 includes the main control circuit 11 and the power supply circuit 12, and controls the operation of the liquid ejecting apparatus 1 including the head unit 20. Further, the control unit 10 may include, in addition to the main control circuit 11 and the power supply circuit 12, a storage circuit for storing various information for the liquid ejecting apparatus 1, an interface circuit for communicating with a host computer or the like provided outside the liquid ejecting apparatus 1, or the like.

Then, the control unit 10 receives an image signal input from an external device such as the host computer provided outside the liquid ejecting apparatus 1, and generates a medium transport signal PT as a transport control signal for controlling the transport of the medium P based on the received image signal and outputs the medium transport signal PT to the transport unit 40. In this way, the transport unit 40 transports the medium P along the Y direction. Such a transport unit 40 includes a roller (not shown) for transporting the medium P, a motor for rotating the roller, and the like.

The liquid container 5 stores ink to be ejected to the medium P. Specifically, the liquid container 5 includes four containers for individually storing four color inks of cyan C, magenta M, yellow Y, and black K. The ink stored in the liquid container 5 is supplied to the ejecting heads 100 of the head unit 20 via a tube (not shown) or the like. The liquid container 5 that supplies ink to the ejecting heads 100 is an example of a liquid accommodating container. The number of containers included in the liquid container 5 is not limited to four. Further, the liquid container 5 may be provided with a container in which inks of different colors are stored in place of or in addition to inks of colors other than cyan C, magenta M, yellow Y, and black K, and a plurality of containers of any one of cyan C, magenta M, yellow Y, and black K may be provided.

The head unit 20 includes ejecting heads 100-1 to 100-6 arranged side by side in the X direction. The ejecting heads 100-1 to 100-6 included in the head unit 20 are arranged side by side from the −X side to the +X side in the order of the ejecting head 100-1, the ejecting head 100-2, ejecting head 100-3, ejecting head 100-4, ejecting head 100-5, and ejecting head 100-6 so as to be equal to or larger than the width of the medium P in the X direction. Then, the head unit 20 distributes the ink supplied from the liquid container 5 to each of the ejecting heads 100-1 to 100-6, and operates based on the image information signal IP input from the control unit 10 to eject the ink supplied from the liquid container 5 from each of the ejecting heads 100-1 to 100-6 to a desired position on the medium P. The number of ejecting heads 100 included in the head unit 20 is not limited to six, and may be five or less, or seven or more.

As described above, in the liquid ejecting apparatus 1, the control unit 10 generates the image information signal IP based on the image signal input from the host computer or the like, and uses the generated image information signal IP to control the operation of the head unit 20 and to control the transport of the medium P in the transport unit 40. In this way, the ink ejected by each of the ejecting heads 100-1 to 100-6 can be landed at a desired position on the medium P. As a result, a desired image is formed on the medium P.

4. Structure of Head Unit

Figure 9:
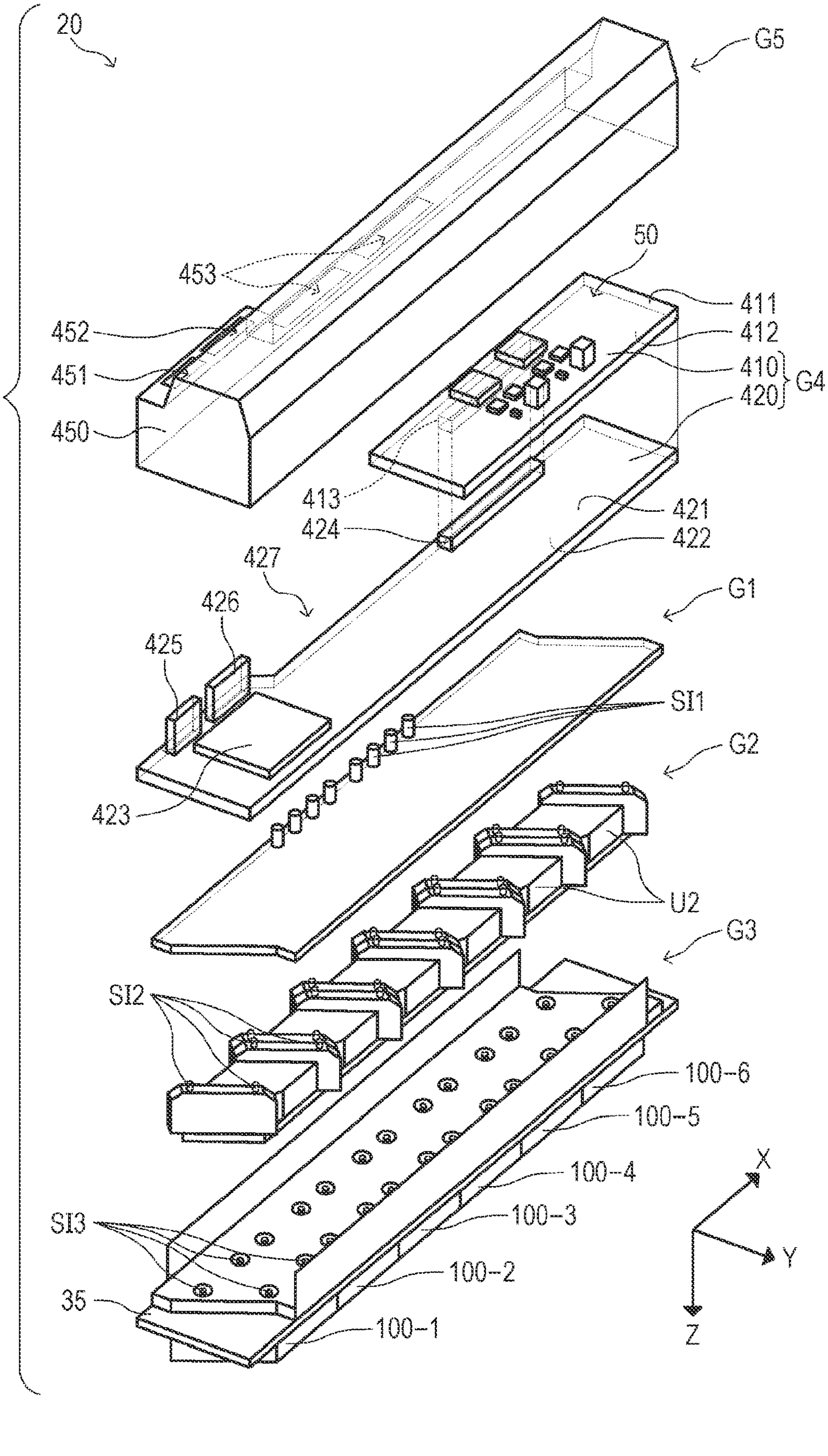
FIG. 9 is an exploded perspective view of a head unit when viewed from a −Z side.

Next, a structure of the head unit 20 will be described. FIG. 9 is an exploded perspective view of the head unit 20 when viewed from the −Z side. Further, FIG. 10 is an exploded perspective view of the head unit 20 when viewed from the +Z side.

Figure 10:
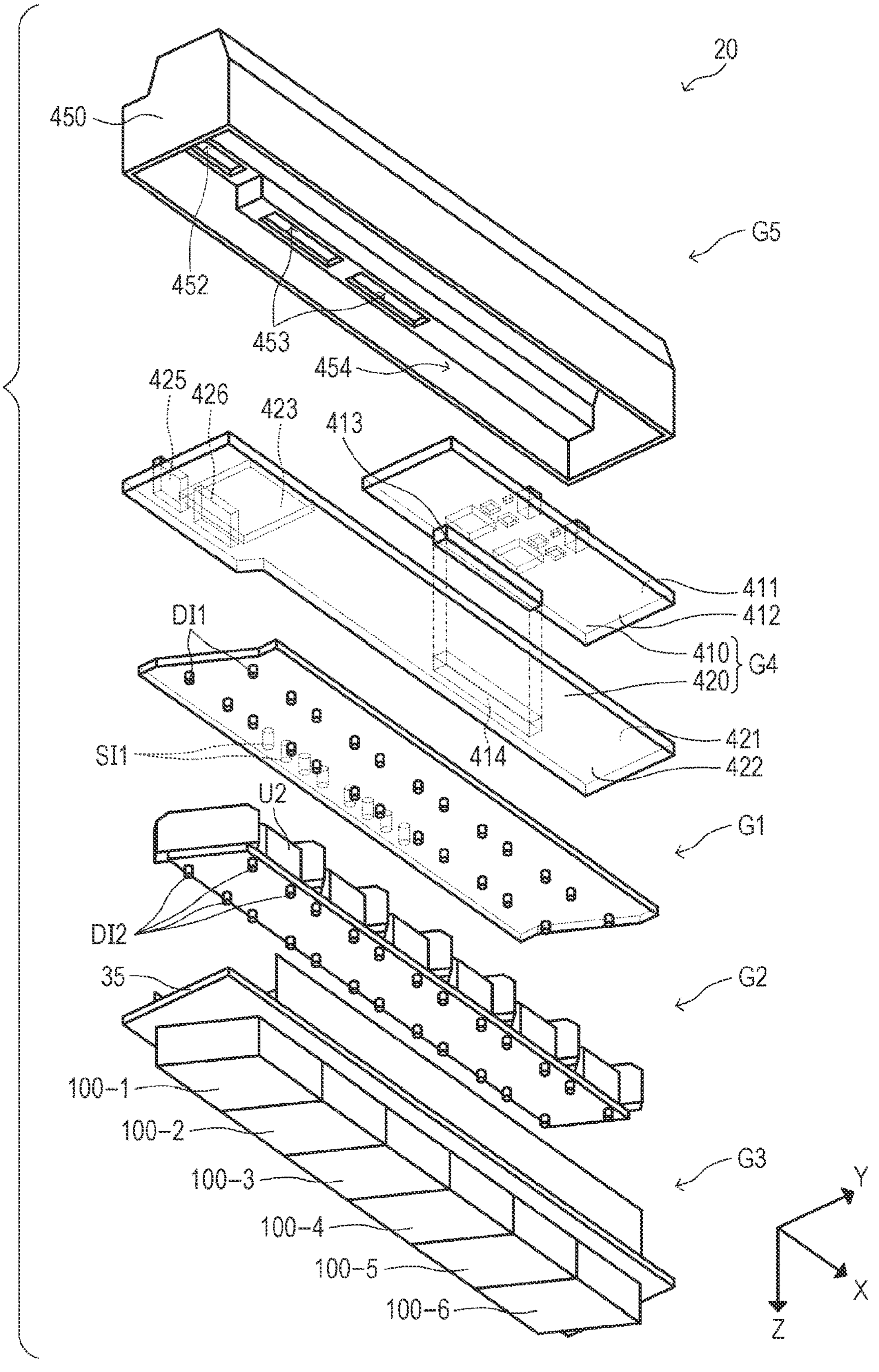
FIG. 10 is an exploded perspective view of the head unit when viewed from a +Z side.

As shown in FIGS. 9 and 10, the head unit 20 includes an introduction flow path portion G1 for introducing the ink supplied from the liquid container 5 into the head unit 20, a supply flow path portion G2 for supplying the introduced ink to the ejecting head 100, a liquid ejecting portion G3 having a plurality of ejecting heads 100 for ejecting ink, an ejection control portion G4 for controlling the ejection of ink from the ejecting head 100, and an accommodating portion G5 for accommodating the introduction flow path portion G1, the supply flow path portion G2, the liquid ejecting portion G3, and the ejection control portion G4.

In the head unit 20, the introduction flow path portion G1, the supply flow path portion G2, the liquid ejecting portion G3, and the ejection control portion G4 are directed from the −Z side to the +Z side in the Z direction, and the ejection control portion G4, the introduction flow path portion G1, the supply flow path portion G2, and the liquid ejecting portion G3 are stacked in this order. The accommodating portion G5 is provided so as to accommodate the ejection control portion G4, the introduction flow path portion G1, the supply flow path portion G2, and the liquid ejecting portion G3, which are stacked. The introduction flow path portion G1, the supply flow path portion G2, the liquid ejecting portion G3, the ejection control portion G4, and the accommodating portion G5 are fixed to each other by fixing means such as an adhesive or a screw (not shown).

As shown in FIGS. 9 and 10, the introduction flow path portion G1 includes a plurality of inlets SI1 according to the number of types of ink supplied to the head unit 20, and a plurality of outlets DI1 according to the number of types of ink and according to the number of ejecting heads 100 included in the head unit 20. The plurality of inlets SI1 are positioned side by side along the side of the introduction flow path portion G1 on −Y side on a surface of the introduction flow path portion G1 on the −Z side. Then, a tube (not shown) or the like to which ink is supplied from the liquid container 5 shown in FIG. 8 is coupled to each of the inlets SI1. Further, the plurality of outlets DI1 are positioned on a surface of the introduction flow path portion G1 on the +Z side. Inside the introduction flow path portion G1, ink flow paths are formed through which the inlets SI1 and the outlets DI1 corresponding to the inlets SI1 communicate with each other.

The supply flow path portion G2 has a plurality of liquid supply units U2 according to the number of ejecting heads 100 included in the head unit 20. Further, each of the plurality of liquid supply units U2 has a plurality of inlets SI2 according to the number of types of ink supplied to the head unit 20, and a plurality of outlets DI2 according to the number of types of ink supplied to the head unit 20. The plurality of inlets SI2 are positioned on the −Z side of the liquid supply unit U2 and are coupled to the outlets DI1 included in the introduction flow path portion G1. That is, the supply flow path portion G2 has inlets SI2 corresponding to the outlets DI1 of the introduction flow path portion G1, respectively. Further, the outlets DI2 are positioned on the −Z side of the liquid supply unit U2. Inside the liquid supply unit U2, an ink flow path is formed through which the inlets SI2 and the outlets DI2 corresponding to the inlets SI2 communicate with each other.

The liquid ejecting portion G3 has the ejecting heads 100-1 to 100-6 and a support member 35. Each of the ejecting heads 100-1 to 100-6 is positioned on the +Z side of the support member 35, and is fixed to the support member 35 by a fixing means such as an adhesive or a screw (not shown). Further, a plurality of inlets SI3 are positioned on the −Z side of each of the ejecting heads 100-1 to 100-6. The plurality of inlets SI3 of each of the ejecting heads 100-1 to 100-6 pass through the openings formed in the support member 35 and are exposed to the −Z side of the liquid ejecting portion G3. Then, the plurality of inlets SI3 are coupled to the plurality of outlets DI2 included in the supply flow path portion G2. That is, the liquid ejecting portion G3 has the inlets SI3 corresponding to the outlets DI2 of the supply flow path portion G2, respectively.

Here, the flow of ink until the ink stored in the liquid container 5 is supplied to the plurality of ejecting heads 100 included in the head unit 20 will be described. The ink stored in the liquid container 5 is introduced from the inlets SI1 of the introduction flow path portion G1 via a tube (not shown) or the like. The ink introduced from the inlets SI1 is distributed corresponding to the plurality of ejecting heads 100 by the ink flow path (not shown) provided inside the introduction flow path portion G1, and then is supplied to the liquid supply unit U2 via the outlets DI1 and the inlets SI2. Then, ink supplied to the liquid supply unit U2 is supplied to the plurality of ejecting heads 100 included in the liquid ejecting portion G3 via the ink flow path, the outlets DI2, and the inlets SI3 provided inside the liquid supply unit U2. That is, in the present embodiment, the introduction flow path portion G1 and the liquid supply unit U2 function as a distribution flow path member for distributing and supplying the ink supplied from the outlets DI1 to the head unit 20 to each of the ejecting heads 100-1 to 100-6.

Figure 11:
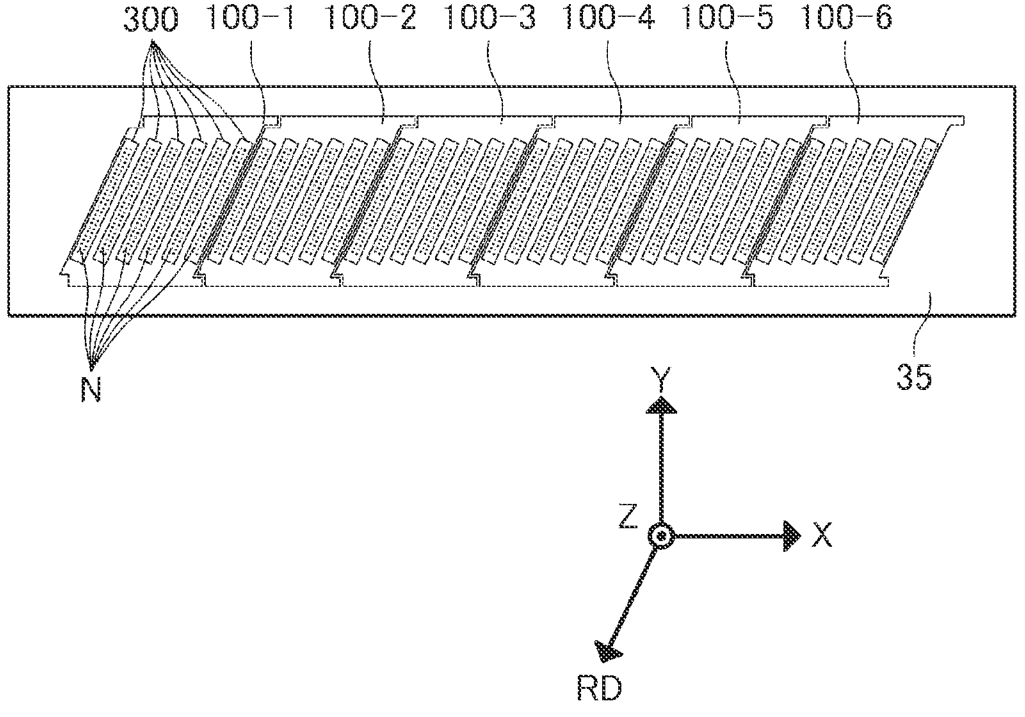
FIG. 11 is a view when the head unit is viewed from the +Z side.

Here, an example of the arrangement of the ejecting heads 100-1 to 100-6 in the head unit 20 will be described. FIG. 11 is a view when the head unit 20 is viewed from the +Z side. As shown in FIG. 11, in the head unit 20, each of the ejecting heads 100-1 to 100-6 has six head chips 300 arranged side by side in the X direction. Further, each head chip 300 has a plurality of nozzles N for ejecting the supplied ink to the medium P. The plurality of nozzles N included in each of the head chips 300 are arranged side by side in a column direction RD in a plane perpendicular to the Z direction and formed by the X direction and the Y direction. In the following description, a plurality of nozzles N arranged side by side in the column direction RD may be referred to as a nozzle row. The number of head chips 300 included in each of the ejecting heads 100-1 to 100-6 is not limited to six.

Figure 12:
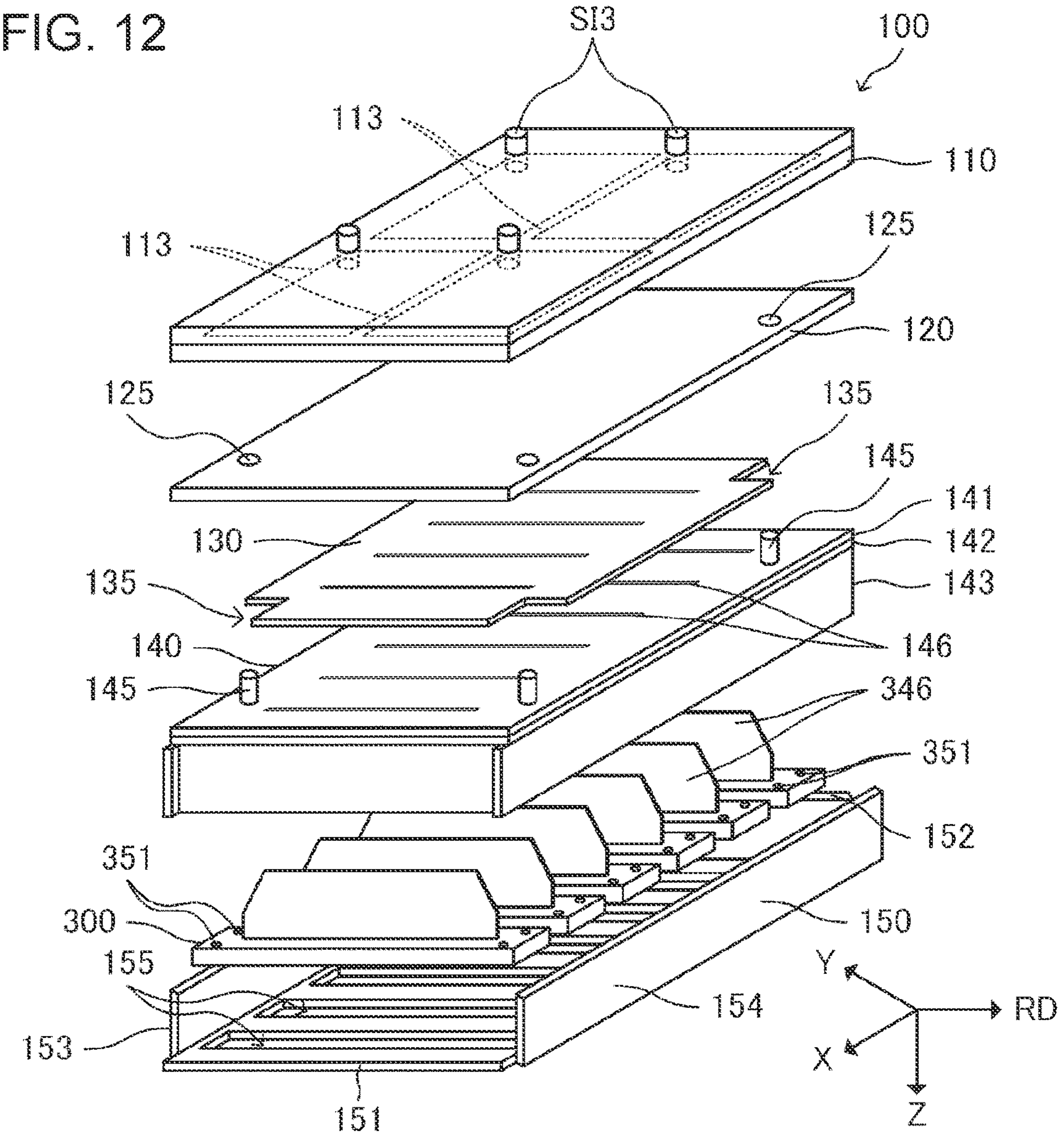
FIG. 12 is an exploded perspective view showing a schematic configuration of an ejecting head.

Next, an example of a structure of the ejecting head 100 will be described. FIG. 12 is an exploded perspective view showing a schematic configuration of the ejecting head 100. As shown in FIG. 12, the ejecting head 100 includes a filter portion 110, a sealing member 120, a wiring substrate 130, a holder 140, six head chips 300, and a fixing plate 150. The ejecting head 100 is configured with the filter portion 110, the sealing member 120, the wiring substrate 130, the holder 140, and the fixing plate 150 being superimposed in this order from the −Z side to the +Z side in the Z direction, and six head chips 300 are accommodated between the holder 140 and the fixing plate 150.

The filter portion 110 has a substantially parallelogram shape in which two opposite sides extend in the X direction and the other two opposite sides extend in the column direction RD. The filter portion 110 has four filters 113 and four inlets SI3. The four inlets SI3 are positioned on the −Z side of the filter portion 110, and are provided corresponding to the four filters 113 positioned inside the filter portion 110. The filter 113 collects air bubbles and foreign substances contained in the ink introduced from the inlet SI3. Then, ink is supplied to the inlets SI3 from the liquid container 5. The inlets SI3 are an example of supply ports.

The sealing member 120 is positioned on the +Z side of the filter portion 110, and has a substantially parallelogram shape in which two opposite sides extend in the X direction and the other two opposite sides extend in the column direction RD. Through openings 125 through which liquid flow paths 145 to be described later is inserted, are provided at four corners of the sealing member 120. The sealing member 120 is formed of, for example, an elastic member such as rubber.

The wiring substrate 130 is positioned on the +Z side of the sealing member 120, and has a substantially parallelogram shape in which two opposite sides extend in the X direction and the other two opposite sides extend in the column direction RD. Further, cutout portions 135 through which the liquid flow paths 145 to be described later passes are formed at the four corners of the wiring substrate 130. The wiring substrate 130 is formed with wiring for propagating, to the head chips 300, various signals such as the drive signals COMA and COMB and the voltages VHV and VDD supplied to the ejecting head 100, and is provided with the above-mentioned diagnostic circuit 250. That is, the wiring substrate 130 is positioned toward the +Z side further than the inlets SI3. In other words, the inlets SI3 are positioned above the wiring substrate 130 in the vertical direction. A specific example of the configuration of the wiring substrate 130 will be described later.

The holder 140 is positioned on the +Z side of the wiring substrate 130, and has a substantially parallelogram shape in which two opposite sides extend in the X direction and the other two opposite sides extend in the column direction RD. The holder 140 has holder members 141, 142, and 143. The holder members 141, 142, and 143 are stacked in the order of the holder member 141, the holder member 142, and the holder member 143 from the −Z side to the +Z side in the Z direction. Further, the holder member 141 and the holder member 142 are adhered to each other by adhesive or the like therebetween, and the holder member 142 and the holder member 143 are adhered to each other by an adhesive or the like therebetween.

Further, inside the holder member 143, an accommodation space having an opening (not shown) on the +Z side is formed. The head chips 300 are accommodated in the accommodation space formed inside the holder member 143. Here, the accommodation space formed inside the holder member 143 may be a plurality of spaces that can individually accommodate the six head chips 300, respectively, and may be one space that can accommodate the six head chips 300 in common.

Further, the holder 140 is provided with slit holes 146 corresponding to the six head chips 300, respectively. Flexible wiring substrates 346 for propagating various signals such as drive signals COMA and COMB, the voltages VHV and VDD to the head chips 300 is inserted into the slit holes 146. Then, the six head chips 300 accommodated in the accommodation space formed inside the holder member 143 are fixed to the holder 140 by an adhesive or the like.

Four liquid flow paths 145 are provided at the four corners of the surface of the holder 140 on the −Z side. The liquid flow paths 145 is coupled to the filter portion 110 through the respective through openings 125 provided in the sealing member 120. In this way, the ink supplied from the inlets SI3 is supplied to the holder 140 via the liquid flow paths 145. Then, the ink supplied to the holder 140 is distributed inside the holder 140 corresponding to the six head chips 300, and then supplied to each of the six head chips 300.

The fixing plate 150 is positioned on the +Z side of the holder 140 and seals the accommodation space in which the six head chips 300 formed inside the holder member 143 are accommodated. The fixing plate 150 has a flat surface portion 151 and bent portions 152, 153, and 154. The flat surface portion 151 has a substantially parallelogram shape in which two opposite sides extend in the X direction and the other two opposite sides extend in the column direction RD. The flat surface portion 151 is formed with six openings 155 for exposing the head chips 300. Then, the head chips 300 are fixed to the fixing plate 150 so that two rows of nozzle rows are exposed to the flat surface portion 151 via the openings 155.

The bent portion 152 is a member coupled to one side extending along the X direction of the flat surface portion 151 and integrated with the flat surface portion 151 bent toward the −Z side, the bent portion 153 is a member coupled to one side extending along the column direction RD of the flat surface portion 151 and integrated with the flat surface portion 151 bent toward the −Z side, and the bent portion 154 is a member coupled to the other side extending along the column direction RD of the flat surface portion 151 and integrated with the flat surface portion 151 bent toward the −Z side.

The head chips 300 are positioned on the +Z side of the holder 140 and on the −Z side of the fixing plate 150. Then, the head chips 300 are accommodated in the accommodation space formed by the holder member 143 of the holder 140 and the fixing plate 150, and is fixed to the holder member 143 and the fixing plate 150.

Figure 13:
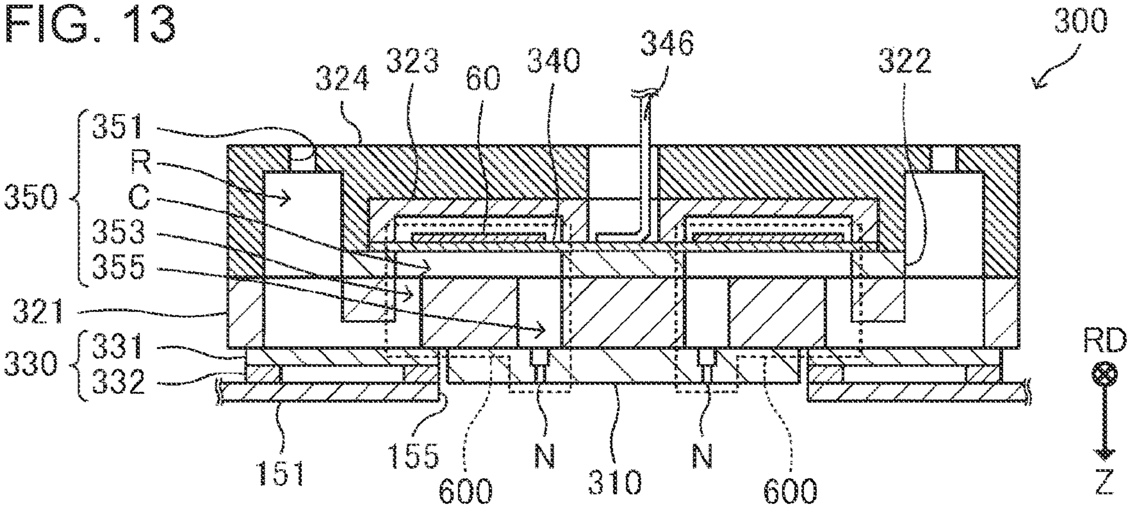
FIG. 13 is a cross-sectional view showing a schematic structure of a head chip.

Here, an example of a structure of the head chip 300 will be described. FIG. 13 is a cross-sectional view showing a schematic structure of the head chip 300. The cross-sectional view of the head chip 300 shown in FIG. 13 shows a case where the head chip 300 is cut in a direction perpendicular to the column direction RD to include at least one nozzle N. As shown in FIG. 13, the head chip 300 has a nozzle plate 310 provided with a plurality of nozzles N for ejecting ink, a flow path forming substrate 321 that defines a communication flow path 355, an individual flow path 353, and a reservoir R, a pressure chamber substrate 322 that defines a pressure chamber C, a protection substrate 323, a compliance portion 330, a diaphragm 340, the piezoelectric element 60, the flexible wiring substrate 346, and a case 324 that defines the reservoir R and a liquid inlet 351. Then, ink is supplied to the head chips 300 from a liquid outlet (not shown) provided in the holder 140 via the liquid inlet 351.

The ink supplied to the head chip 300 reaches the nozzle N via the ink flow path 350 including the reservoir R, the individual flow path 353, the pressure chamber C, and the communication flow path 355. Then, the ink reached by the nozzles N is ejected as the piezoelectric element 60 is driven.

Specifically, the ink flow path 350 is formed by stacking the flow path forming substrate 321, the pressure chamber substrate 322, and the case 324 in the Z direction. The ink introduced into the case 324 from the liquid inlet 351 is stored in the reservoir R. The reservoir R is a common flow path communicating with a plurality of individual flow paths 353 corresponding to the plurality of nozzles N constituting the nozzle row, respectively. The ink stored in the reservoir R is supplied to the pressure chamber C via the individual flow path 353.

The pressure chamber C applies pressure to the stored ink to eject the ink supplied to the pressure chamber C from the nozzle N via the communication flow path 355. The diaphragm 340 is positioned on the −Z side of the pressure chamber C to seal the pressure chamber C, and the piezoelectric element 60 is positioned on the −Z side of the diaphragm 340. The piezoelectric element 60 is composed of a piezoelectric body and a pair of electrodes formed on both sides of the piezoelectric body. The drive signal VOUT is supplied to one of the pair of electrodes of the piezoelectric element 60 via the flexible wiring substrate 346, and the reference voltage signal VBS is supplied to the other of the pair of electrodes of the piezoelectric element 60 via the flexible wiring substrate 346. Then, the piezoelectric body is displaced according to the potential difference generated between the pair of electrodes. That is, the piezoelectric element 60 including the piezoelectric body is driven. Then, as the piezoelectric element 60 is driven, the diaphragm 340 provided with the piezoelectric element 60 is deformed, so that the internal pressure of the pressure chamber C changes, and as a result, the ink stored in the pressure chamber C is ejected from the nozzle N via the communication flow path 355.

Further, the nozzle plate 310 and the compliance portion 330 are fixed to the +Z side of the flow path forming substrate 321. The nozzle plate 310 is positioned on the +Z side of the communication flow path 355. A plurality of nozzles N are arranged side by side on the nozzle plate 310 in the column direction RD. That is, the nozzle plate 310 has the plurality of nozzles N for ejecting ink. The compliance portion 330 is positioned on the +Z side of the reservoir R and the individual flow path 353, and includes a sealing film 331 and a support 332. The sealing film 331 is a flexible film-like member, and seals the reservoir R and the individual flow path 353 on the +Z side. Then, the outer peripheral edge of the sealing film 331 is supported by the frame-shaped support 332. Further, the support 332 is fixed to the flat surface portion 151 of the fixing plate 150 on the +Z side. The compliance portion 330 configured as described above protects the head chip 300 and reduces ink pressure fluctuations inside the reservoir R and inside the individual flow path 253.

Here, the configuration including the piezoelectric element 60, the diaphragm 340, the nozzle N, the individual flow path 353, the pressure chamber C, and the communication flow path 355 corresponds to the ejecting portion 600 described above. The head chip 300 including the nozzle plate 310 is an example of an ejecting module.

Referring back to FIG. 12, the ejecting head 100 distributes the ink supplied from the liquid container 5 to the plurality of nozzles N, and ejects the ink from the nozzles N by driving the piezoelectric element 60 generated based on the drive signal VOUT and the reference voltage signal VBS supplied via the flexible wiring substrate 346. Here, the drive signal selection circuit 200 that outputs the drive signal VOUT may be provided on the wiring substrate 130, or may be provided on the flexible wiring substrate 346 corresponding to each of the head chips 300. In the following description, it is assumed that the semiconductor device including the drive signal selection circuit 200 is mounted on the flexible wiring substrate 346 corresponding to each of the head chips 300 by Chip On Film (COF). In this way, the wiring substrate 130 can be miniaturized, and therefore the ejecting head 100 can be miniaturized.

Referring back to FIGS. 9 and 10, the ejection control portion G4 is positioned on the −Z side of the introduction flow path portion G1 and includes a wiring substrate 410 and a wiring substrate 420.

The wiring substrate 410 includes a surface 411 and a surface 412 positioned on the opposite side of the surface 411. Then, the wiring substrate 410 is disposed such that the surface 412 faces the introduction flow path portion G1, the supply flow path portion G2, and the liquid ejecting portion G3, and the surface 411 faces the side opposite to the introduction flow path portion G1, the supply flow path portion G2, and the liquid ejecting portion G3.

The drive signal output circuit 50 for outputting the drive signals COMA and COMB is provided on the surface 411 of the wiring substrate 410. Further, a coupling portion 413 is provided on the surface 412 of the wiring substrate 410. The coupling portion 413 electrically couples the wiring substrate 410 to the wiring substrate 420, propagates the drive signals COMA and COMB generated by the drive signal output circuit 50, and propagates a plurality of signals including basic drive signals dA and dB that are the basis of the drive signals COMA and COMB output by the drive signal output circuit 50.

The wiring substrate 420 includes a surface 421 and a surface 422 positioned on the opposite side of the surface 421. Then, the wiring substrate 420 is disposed so that the surface 422 faces the introduction flow path portion G1, the supply flow path portion G2, and the liquid ejecting portion G3, and the surface 421 faces the side opposite to the introduction flow path portion G1, the supply flow path portion G2, and the liquid ejecting portion G3. Further, a cutout portion 427 for the inlets SI1 of the introduction flow path portion G1 to pass through is formed on the −Y side of the wiring substrate 420.

A semiconductor device 423 and coupling portions 424, 425, and 426 are provided on the surface 421 of the wiring substrate 420. The coupling portion 424 is coupled to the coupling portion 413 provided on the wiring substrate 410. In this way, the wiring substrate 420 is electrically coupled to the wiring substrate 410. As the coupling portion 424, a board-to-board (B-to-B) connector that electrically couples the wiring substrate 410 to the wiring substrate 420 without using a cable is used. The semiconductor device 423 is a circuit component that constitutes at least a part of the head control circuit 21 described above, and includes, for example, a SoC or the like. The semiconductor device 423 is provided in a region of the wiring substrate 420 further to the −X side than the coupling portion 424. The voltages VHV and VDD that function as the power supply voltage of the head unit 20 are input to the coupling portion 426. The coupling portion 426 is positioned on the −Y side of the semiconductor device 423 and on the −X side of the cutout portion 427. The image information signal IP output by the control unit 10 is input to the coupling portion 425. That is, the coupling portion 425 has a plurality of terminals through which the input image information signal IP propagates. The coupling portion 425 is disposed on the −Y side of the semiconductor device 423 and on the −X side of the coupling portion 426 so that a plurality of terminals into which the image information signal IP is input are lined up in the X direction.

Here, the image information signal IP input to the coupling portion 425 is a signal compliant with a communication standard for high-speed communication such as PCIe, as described above. Therefore, it is preferable that the coupling portion 425 and the cable coupled to the coupling portion 425 have a configuration capable of stably propagating signals of several Gbps, and it is preferable that, for the coupling portion 425, for example, a high-speed transmission connector, such as an HDMI (registered trademark) (high-definition multimedia interface) connector compliant with HDMI communication standard and a USB connector compliant with universal serial bus (USB) communication standard, is used.

Meanwhile, since the voltages VHV and VDD are propagated to the coupling portion 426, a cable capable of stably propagating high voltage signals can be coupled to the coupling portion 426, and it is preferable that, for example, an FFC connector to which a flexible cable can be coupled is used.

The accommodating portion G5 includes a housing 450 in which opening holes 451, 452, and 453 are formed. The housing 450 has a substantially rectangular shape including a pair of long sides extending in the X direction and a pair of short sides extending in the Y direction when viewed in the Z direction, and is formed of, for example, a metal such as aluminum, a resin, or the like.

An opening 454 is formed on the +Z side of the housing 450. The opening 454 accommodates the introduction flow path portion G1, the supply flow path portion G2, the liquid ejecting portion G3, and the ejection control portion G4. That is, the opening 454 forms an accommodation space for accommodating the introduction flow path portion G1, the supply flow path portion G2, the liquid ejecting portion G3, and the ejection control portion G4. Then, the introduction flow path portion G1, the supply flow path portion G2, the liquid ejecting portion G3, and the ejection control portion G4 accommodated in the opening 454 are fixed to the housing 450 by fixing means such as an adhesive or a screw (not shown). Here, even if the opening 454 may be configured to be sealed by the support member 35 of the liquid ejecting portion G3 in a state of accommodating the introduction flow path portion G1, the supply flow path portion G2, and the liquid ejecting portion G3.

The opening holes 451, 452, and 453 of the housing 450 are arranged side by side in the order of the opening hole 451, the opening hole 452, and the opening hole 453 from the −X side to the +X side in the X direction on the −Y side of the housing 450. The coupling portion 425 of the ejection control portion G4 accommodated in the accommodation space is inserted into the opening hole 451. The coupling portion 426 of the ejection control portion G4 accommodated in the accommodation space is inserted into the opening hole 452. The inlet SI1 of the introduction flow path portion G1 is inserted into the opening hole 453 after passing through the cutout portion 427 of the wiring substrate 420. That is, the opening holes 451, 452, and 453 expose, to the outside of the head unit 20, the inlet SI1 for supplying ink to the introduction flow path portion G1, the supply flow path portion G2, and the liquid ejecting portion G3 accommodated in the housing 450, and the coupling portions 425 and 426 for propagating various signals to the liquid ejecting portion G3 and the ejection control portion G4. In this way, the accommodating portion G5 protects the introduction flow path portion G1, the supply flow path portion G2, the liquid ejecting portion G3, and the ejection control portion G4 with the housing 450, and the coupling portions 425 and 426 for propagating various signals to the inlet SI1 for supplying ink, the liquid ejecting portion G3, and the ejection control portion G4 are exposed to the outside of the head unit 20, and thus the replacement work of the head unit 20 becomes easy, and the maintainability of the liquid ejecting apparatus 1 can be improved.

5. Construction of Wiring Substrate and Ink Adhesion Detection by Integrated Circuit As described above, the ejecting head 100 in the present embodiment generates the drive signal VOUT by selecting the trapezoidal waveforms Adp1, Adp2, Bdp1, and Bdp2 included in the drive signals COMA and COMB at timing defined by the print data signal cSI corresponding to the print data signal SI, the clock signal cSCK corresponding to the clock signal SCK, the latch signal cLAT corresponding to the latch signal LAT, and the change signal cCH corresponding to the change signal CH. Then, the ejecting head 100 supplies the generated drive signal VOUT to the piezoelectric element 60 included in the ejecting portion 600. In this way, the piezoelectric element 60 is driven according to the potential of the drive signal VOUT, and an amount of ink corresponding to the drive amount of the piezoelectric element 60 is ejected to the medium P. As a result, an image is formed on the medium P.

When an abnormality occurs in the ejecting head 100, the ejection accuracy of the ink ejected by the ejecting head 100 is lowered, and the quality of the image formed on the medium P is lowered. In order to reduce the possibility that the image quality is lowered, the liquid ejecting apparatus 1 in the present embodiment has the diagnostic circuit 250 for diagnosing the presence or absence of an abnormality in the ejecting head 100.

When diagnosing the presence or absence of an abnormality in the ejecting head 100 as described above, the diagnostic circuit 250 diagnoses an operation abnormality in the ejecting head 100 or a temperature abnormality in the ejecting head 100. Further, the diagnostic circuit 250 in the present embodiment also detects whether or not the ink mist entering into the ejecting head 100 adheres to the inside of the ejecting head 100.

Here, an example of the ink mist entering into the ejecting head 100 includes ink mist floating inside the liquid ejecting apparatus 1 due to a part of the ink ejected from the nozzles N becoming mist before landing on the medium P, and ink mist floating inside the liquid ejecting apparatus 1 by the ink ejected from the nozzles N becoming mist by being refloated by the air flow generated by the transport of the medium P after landing on the medium P. The ink mist floating inside the liquid ejecting apparatus 1 is extremely small, and thus it is charged by the Lenard effect. For this reason, the ink mist is attracted to conductive portions such as wiring patterns and terminals that propagate various signals to the ejecting head 100, and enters into the ejecting head 100.

Then, when the ink mist enters into the ejecting head 100 and the entering ink mist adheres to the wiring, terminals, electronic components, or the like, provided in the ejecting head 100, various abnormalities such as a short-circuit abnormality may occur in the ejecting head 100. In the liquid ejecting apparatus 1 of the present embodiment, the diagnostic circuit 250 detects the presence or absence of an operation abnormality or temperature abnormality occurring in the ejecting head 100, and also detects whether or not ink adheres to the inside of the ejecting head 100, thereby reducing the possibility that an abnormality occurs due to the ink adhering to the inside of the ejecting head 100.

Here, a specific configuration for detecting whether or not ink adheres to the inside of the ejecting head 100 by the diagnostic circuit 250 will be described.

Figure 14:
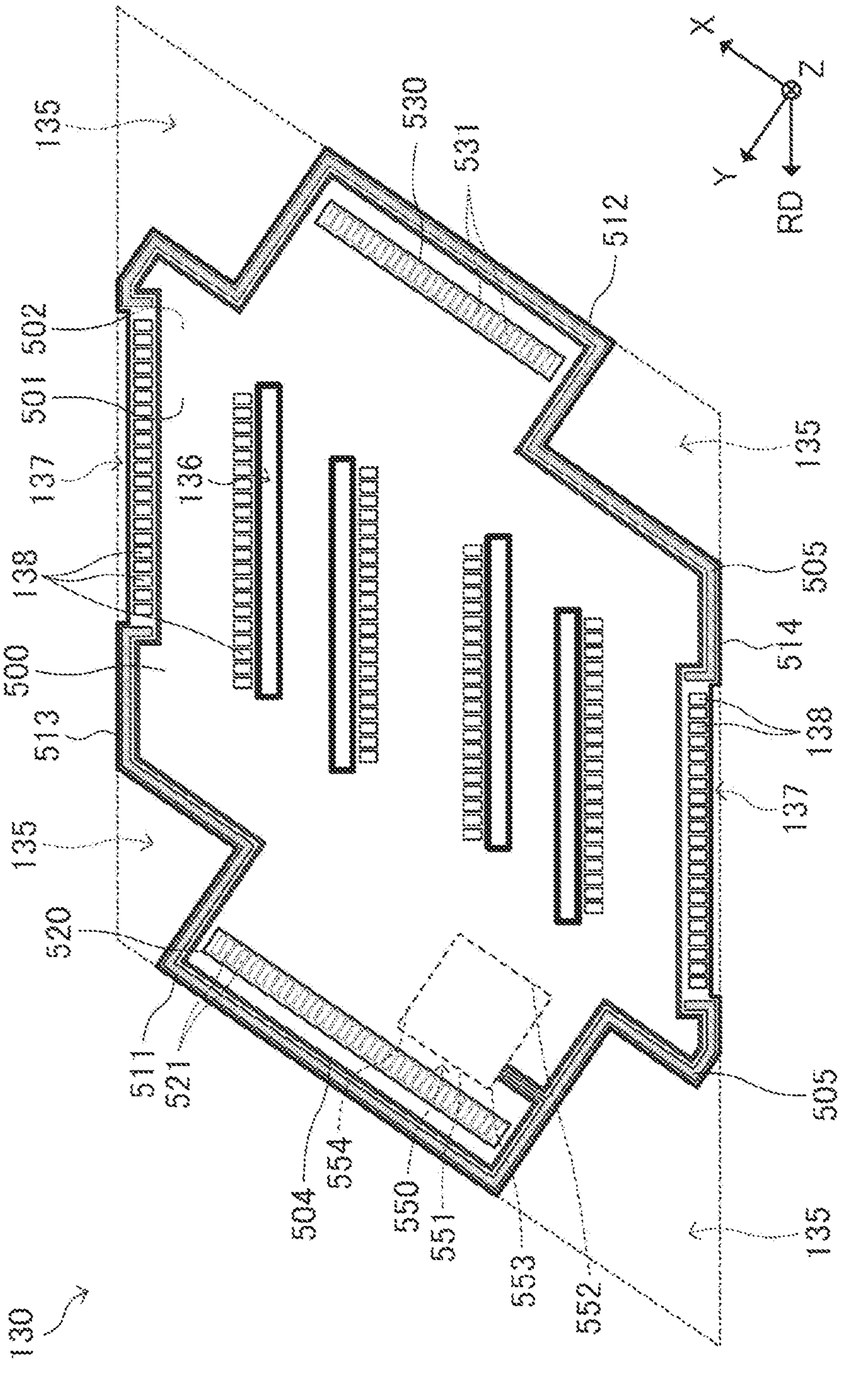
FIG. 14 is a diagram showing an example of a configuration of a wiring substrate when the wiring substrate is viewed from the −Z side.
Figure 15:
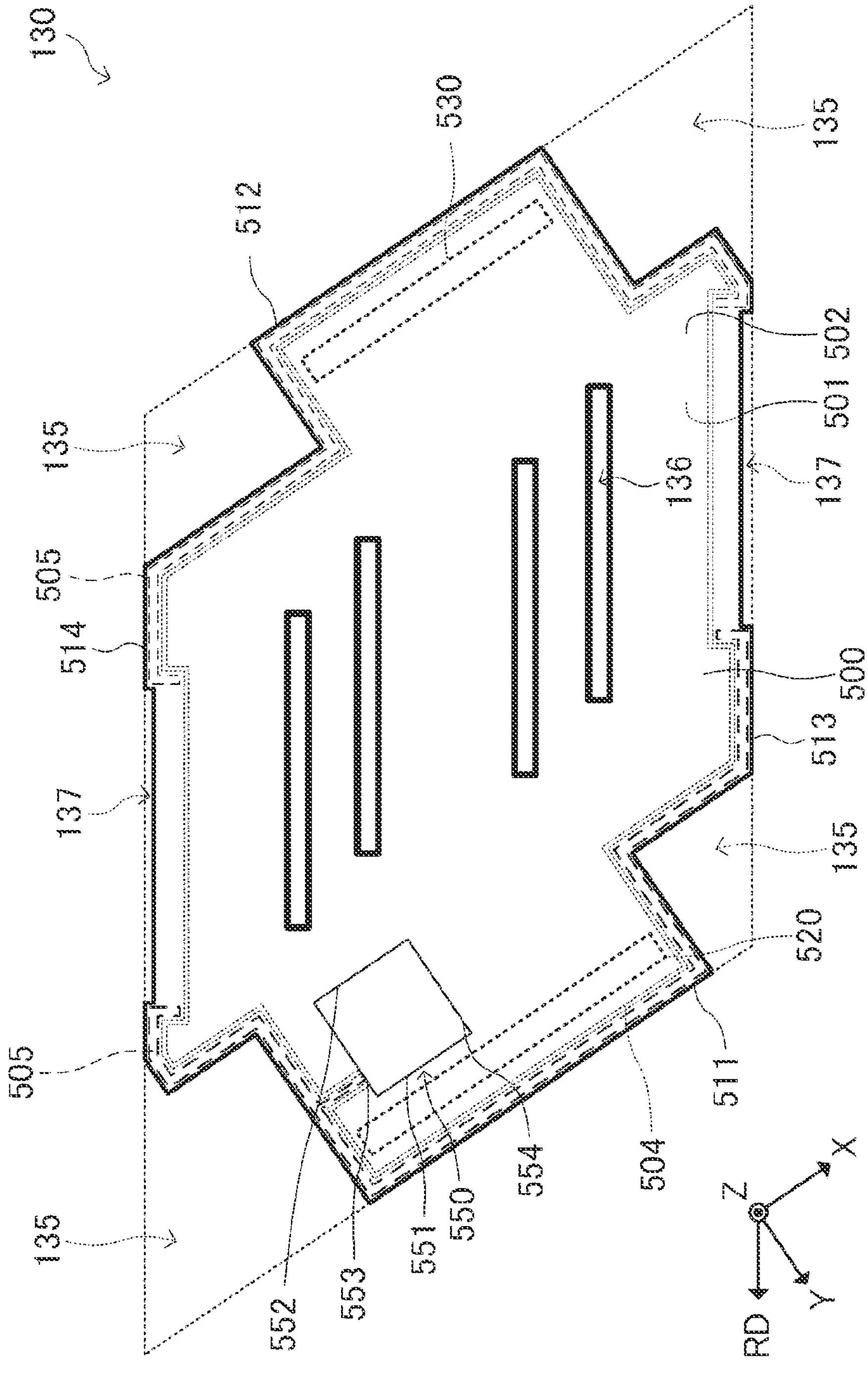
FIG. 15 is a diagram showing an example of a configuration of a wiring substrate when the wiring substrate is viewed from the +Z side.

FIG. 14 is a diagram showing an example of a configuration of the wiring substrate 130 when the wiring substrate 130 having an integrated circuit 550 including the diagnostic circuit 250 is viewed from the −Z side. Further, FIG. 15 is a diagram showing an example of the configuration of the wiring substrate 130 when the wiring substrate 130 is viewed from the +Z side. FIG. 14 shows a part of the configuration that cannot be visually recognized when the wiring substrate 130 is viewed from the −Z side by a broken line, and similarly, FIG. 15 shows a part of the configuration that cannot be visually recognized when the wiring substrate 130 is viewed from the +Z side by a broken line.

In describing the configuration for the diagnostic circuit 250 to detect whether or not ink mist adheres to the inside of the ejecting head 100, first, the configuration of the wiring substrate 130 provided with the integrated circuit 550 including the diagnostic circuit 250 will be described.

As shown in FIGS. 14 and 15, the wiring substrate 130 includes a substrate 500, coupling portions 520 and 530, and the integrated circuit 550. The wiring substrate 130 may include various electronic components such as a resistance element, a capacitance element, an induction element, and a semiconductor element in addition to the substrate 500, coupling portions 520 and 530, and the integrated circuit 550. Further, although not shown, the wiring substrate 130 may include the temperature detection circuit 260 described above.

The substrate 500 has a substantially parallelogram shape having sides 511 and 512 positioned opposite to each other and sides 513 and 514 positioned opposite to each other, and has a surface 501 and a surface 502 different from the surface 501 and positioned opposite to the surface 501. Here, the side 511 is an example of a first side, the side 512 is an example of a second side, the side 513 is an example of a third side, and the side 514 is an example of a fourth side. Further, the surface 501 is an example of a first surface, and the surface 502 is an example of a second surface.

Then, in the substrate 500, the side 511 extends in the X direction, the side 512 is positioned on the −Y side of the side 511 and extends in the X direction, and the side 513 extends in the column direction RD, the side 514 is positioned on the −X side of the side 513 and extends in the column direction RD, and the surface 501 is provided on the −Z side and the surface 502 is provided on the +Z side. That is, in the substrate 500, the side 511 and the side 512 are positioned opposite to each other in the direction along the Y direction, the side 513 and the side 514 are positioned opposite to each other in the direction along the X direction, the surface 501 is positioned to face upward and the surface 502 is positioned to face downward in the vertical direction. In this case, the substrate 500 is preferably positioned so that the surface 501 is orthogonal to the vertical direction.

Further, cutout portions 135 are formed at the four corners of the substrate 500. The liquid flow paths 145 provided in the holder 140 pass through the cutout portions 135. In other words, the ejecting head 100 has the liquid flow paths 145 that communicate with the inlets SI3, and at least some of the liquid flow paths 145 pass through the cutout portions 135 that penetrates the surface 501 and the surface 502 of the substrate 500. Here, the cutout portions 135 may be configured such that the liquid flow paths 145 provided in the holder 140 positioned on the +Z side of the substrate 500 and the inlets SI3 included in the filter portion 110 positioned on the −Z side of the substrate 500 can be communicatively coupled to each other, and are not limited to being cut out. That is, the substrate 500 may have holes provided to penetrate the surface 501 and the surface 502 for inserting the liquid flow paths 145. Here, the cutout portions 135 through which the liquid flow paths 145 pass are an example of a penetrating portion.

Further, in the substrate 500, four flat printed circuit (FPC) insertion holes 136 penetrating the surface 501 and the surface 502 of the substrate 500 are formed, and two FPC cutout portions 137 in which a part of each of the side 513 and the side 514 of the substrate 500 is cut out are formed. The flexible wiring substrate 346 of each of the six head chips 300 accommodated in the holder 140 passes through each of the four FPC insertion holes 136 and the FPC cutout portions 137. The flexible wiring substrate 346 passing through each of the four FPC insertion holes 136 and the FPC cutout portions 137 is electrically coupled to coupling terminals 138 formed on the surface 501 of the substrate 500. In this way, the wiring substrate 130 and the head chip 300 are electrically coupled to each other.

In the following description, the substrate 500 will be described as having the surface 501 and the surface 502 positioned opposite to the surface 501 in configuration, but the substrate 500 may be a so-called multilayer substrate including a plurality of wiring layers between the surface 501 and the surface 502.

The coupling portion 520 has a plurality of terminals 521. Then, the coupling portion 520 is provided on the surface 501 of the substrate 500 so that the plurality of terminals 521 are arranged side by side along the side 511. A flexible cable (not shown) for electrically coupling the wiring substrate 420 to the wiring substrate 130, or the like, is attached to the coupling portion 520 configured in this way. Further, the coupling portion 530 has a plurality of terminals 531. Then, the coupling portion 530 is provided on the surface 501 of the substrate 500 so that the plurality of terminals 531 are arranged side by side along the side 512. A flexible cable (not shown) for electrically coupling the wiring substrate 420 to the wiring substrate 130 is attached to the coupling portion 530 configured in this way.

That is, the coupling portions 520 and 530 electrically couple the wiring substrate 420 to the wiring substrate 130 via a flexible cable (not shown). In this way, the six print data signals SI corresponding to the head chips 300-1 to 300-6 output by the wiring substrate 420, the clock signal SCK, the latch signal LAT, the change signal CH, and the drive signals COMA and COMB are input. At least one of the coupling portions 520 and 530 is an example of a connector. Then, various signals are input to the wiring substrate 130 from the wiring substrate 420 via the coupling portions 520 and 530, and various signals output by the ejecting head 100 including the wiring substrate 130 are output to the wiring substrate 420.

The integrated circuit 550 is a substantially rectangular semiconductor device having sides 551 and 552 positioned opposite to each other and sides 553 and 554 positioned opposite to each other, and includes the diagnostic circuit 250. Then, the integrated circuit 550 is provided on the surface 502 of the substrate 500 so that the side 551 extends along the side 511 in the X direction, the side 552 extends in the X direction on the −Y side of the side 551, the side 553 extends in the Y direction, and the side 554 extends in the Y direction on the −X side of the side 553. The integrated circuit 550 is a surface mount component and is preferably electrically coupled to the substrate 500 via a bump electrode.

The integrated circuit 550 is a surface mount component, and may be, for example, a quad flat no leaded package (QFN) that is electrically coupled to the substrate 500 via a plurality of electrodes formed along the sides 551, 552, 553, and 554, or may be a quad flat package (QFP) that is electrically coupled to the substrate 500 via a plurality of terminals instead of the plurality of electrodes of the QFN; however, as described above, by electrically coupling the integrated circuit 550 to the substrate 500 via the bump electrodes, the bump electrodes to be electrically coupled to the substrate 500 can be provided at a high density in the integrated circuit 550, which makes it possible to miniaturize the integrated circuit 550.

Further, as shown in FIGS. 14 and 15, the integrated circuit 550 is positioned in the vicinity of the coupling portion 520 extending along the side 511. Therefore, the six print data signal SI, the latch signal LAT, the change signal CH, and the clock signal SCK input to the integrated circuit 550 are preferably input from the coupling portion 520, and further, are preferably input from the terminal 521 on the –X side disposed in the vicinity of the integrated circuit 550, among the plurality of terminals 521 provided side by side along the side 511 in the coupling portion 520. In this way, it is possible to shorten the length of wiring through which the six print data signal SI, the latch signal LAT, the change signal CH, and the clock signal SCK are propagated, thereby reducing the possibility that noise or the like is superimposed on the six print data signals SI, the latch signal LAT, the change signal CH, and the clock signal SCK.

As described above, a plurality of signals including the six print data signals SI corresponding to the six head chips 300, the latch signal LAT, the change signal CH, the clock signal SCK, the drive signals COMA and COMB, the reference voltage signal VBS, and the voltages VHV and VDD are input to the wiring substrate 130 via the coupling portions 520 and 530. Then, among the plurality of signals input to the wiring substrate 130, the six print data signals SI, the latch signal LAT, the change signal CH, and the clock signal SCK are input to the integrated circuit 550. The diagnostic circuit 250 included in the integrated circuit 550 diagnoses the presence or absence of an operation abnormality in the ejecting head 100 based on the logic levels of the input six print data signals SI, the latch signal LAT, the change signal CH, and the clock signal SCK.

That is, the integrated circuit 550 includes the diagnostic circuit 250, and the six print data signals SI, the latch signal LAT, the change signal CH, and the clock signal SCK are input to the diagnostic circuit 250 included in the integrated circuit 550 via the coupling portions 520 and 530. Then, the diagnostic circuit 250 included in the integrated circuit 550 diagnoses the presence or absence of an abnormality in the ejecting head 100 and outputs the abnormality detection signal AD.

When it is diagnosed in the diagnostic circuit 250 that no operation abnormality occurs in the ejecting head 100, the integrated circuit 550 generates the six print data signal cSI corresponding, respectively, to the six print data signals SI, the latch signal cLAT corresponding to the latch signal LAT, the change signal cCH corresponding to the change signal CH, and the clock signal cSCK corresponding to the clock signal SCK, and supplies the generated signals to the corresponding coupling terminals 138.

Further, among the plurality of signals input to the wiring substrate 130, the drive signals COMA and COMB, the reference voltage signal VBS, and the voltages VHV and VDD are propagated by a wiring pattern (not shown) provided on the substrate 500, and supplied to the corresponding coupling terminals 138.

The print data signals cSI, the latch signal cLAT, the change signal cCH, the clock signal cSCK, the drive signals COMA and COMB, the reference voltage signal VBS, and voltages VHV and VDD, which are supplied to the coupling terminals 138, propagate through the flexible wiring substrate 346 electrically coupled to the coupling terminals 138, and are input to drive signal selection circuit 200 mounted on the flexible wiring substrate 346 by COF. Then, the drive signal selection circuit 200 generates the drive signal VOUT based on the input print data signals cSI, the latch signal cLAT, the change signal cCH, the clock signal cSCK, the drive signals COMA and COMB, the reference voltage signal VBS, and the voltages VHV and VDD and outputs the generated drive signal VOUT to the head chips 300. In this way, a predetermined amount of ink is ejected from the nozzles N of the head chips 300 at a predetermined timing.

Here, as shown in FIGS. 14 and 15, the integrated circuit 550 including the diagnostic circuit 250 is provided on the surface 502 of the substrate 500, and the coupling portions 520 and 530 are provided on the surface 501 of the substrate 500. That is, in the wiring substrate 130, the coupling portions 520 and 530, and the integrated circuit 550 are provided on different mounting surfaces of the substrate 500. Then, the substrate 500 is provided on the ejecting head 100 so that the integrated circuit 550 lies on the side closer to the head chips 300. That is, the integrated circuit 550 is positioned between the substrate 500 and the head chips 300.

As described above, flexible cables (not shown) for electrically coupling the wiring substrate 420 to the wiring substrate 130 are inserted into the coupling portions 520 and 530 of the wiring substrate 130. Therefore, in the ejecting head 100, gaps for insertion for the flexible cable to pass through the inside and the outside of the ejecting head 100 are formed in the vicinity of the coupling portions 520 and 530. Since gaps to pass through the inside and the outside of the ejecting head 100 are formed in the vicinity of the coupling portions 520 and 530, most of the ink mist seems to enter into the ejecting head 100 from the vicinity of the coupling portions 520 and 530.

As shown in FIGS. 14 and 15, when the integrated circuit 550 including the diagnostic circuit 250 is disposed in the vicinity of the coupling portion 520 or the coupling portion 530 to which each of the six print data signals SI, the latch signal LAT, the change signal CH, and the clock signal SCK is input, the length of wiring through which each of the six print data signals SI, the latch signal LAT, the change signal CH, and the clock signal SCK is propagated can be shortened. In this way, the possibility that noise is superimposed on the six print data signals SI, the latch signal LAT, the change signal CH, and the clock signal SCK is reduced. That is, by disposing the integrated circuit 550 in the vicinity of the coupling portion 520 or the coupling portion 530, it is possible to improve the accuracy of detecting the presence or absence of an operation abnormality in the ejecting head 100 by the diagnostic circuit 250 of the integrated circuit 550.

On the other hand, when the integrated circuit 550 is disposed in the vicinity of the coupling portion 520 or the coupling portion 530, a large amount of ink mist enters from the vicinity of the coupling portions 520 and 530, and thus Ink mist unintentionally adheres to the integrated circuit 550, and as a result, the possibility that malfunction of the integrated circuit 550 occurs is increased. That is, when the integrated circuit 550 is disposed in the vicinity of the coupling portion 520 or the coupling portion 530, there is a possibility that the accuracy of detecting the presence or absence of the operation abnormality in the ejecting head 100 is reduced in the diagnostic circuit 250 of the integrated circuit 550.

In order to solve such a problem, in the wiring substrate 130, the coupling portions 520 and 530 and the integrated circuit 550 are provided on different mounting surfaces of the substrate 500, and accordingly, the substrate 500 functions as a shielding wall that reduces the possibility that ink mist adheres to the integrated circuit 550, and as a result, even when the integrated circuit 550 is disposed in the vicinity of the coupling portion 520 or the coupling portion 530, the possibility that ink mist unintentionally adheres to the integrated circuit 550 can be reduced. Therefore, the accuracy of detecting the presence or absence of the operation abnormality of the ejecting head 100 by the diagnostic circuit 250 can be improved, and the possibility that malfunction of the integrated circuit 550 occurs due to the influence of the ink mist can be reduced.

Further, as described above, in the liquid ejecting apparatus 1 of the present embodiment, the inlets SI3 for supplying ink to the ejecting head 100 are positioned on the −Z side of the wiring substrate 130. That is, the inlets SI3 are positioned above the substrate 500 in the vertical direction. Therefore, the substrate 500 is positioned between the inlets SI3 supplying ink to the ejecting head 100 and the integrated circuit 550, and as a result, even if ink leaks from the inlets SI3 for introducing ink into the ejecting head 100 when the ejecting head 100 is removed for maintenance of the head unit 20 or the ejecting head 100, the possibility that the leaked ink unintentionally adheres to the integrated circuit 550 is reduced. That is, even if the ink leaks from the inlets SI3, the possibility that malfunction of the integrated circuit 550 occurs due to the influence of the leaked ink is reduced.

As described above, by providing the integrated circuit 550 including the diagnostic circuit 250 on the surface 502 of the substrate 500 and providing the coupling portions 520 and 530 on the surface 501 of the substrate 500, it is possible to improve the accuracy of detecting the presence or absence of an operation abnormality of the ejecting head 100 by the diagnostic circuit 250, and to reduce the possibility that malfunction of the integrated circuit 550 occurs due to the influence of ink mist or the like.

However, the diagnostic circuit 250 shown in the present embodiment also detects whether or not ink mist adheres to the inside of the ejecting head 100. When the integrated circuit 550 having the diagnostic circuit 250 is provided on the surface 502 different from the surface 501 on which the coupling portions 520 and 530 are provided, it is difficult for the diagnostic circuit 250 to detect the state of ink adhesion on the surface 501 of the substrate 500 where a large amount of ink mist may float, and as a result, the accuracy of detecting the presence or absence of ink mist adhering to the wiring substrate 130 by the diagnostic circuit 250 is lowered. In response to the problem, in the ejecting head 100 of the present embodiment, the integrated circuit 550 having the diagnostic circuit 250 has a detecting means capable of reducing the possibility that the accuracy of detecting whether or not ink adheres to the wiring substrate 130 may be lowered even if provided on the surface 502 different from the surface 501 on which the coupling portions 520 and 530 are provided.

Specifically, as shown in FIGS. 14 and 15, by setting the integrated circuit 550 including the diagnostic circuit 250 to be the detecting means for detecting the presence or absence of ink adhering to the wiring substrate 130, the ejecting head 100 is electrically coupled to the integrated circuit 550 and has an annular wiring 504 provided in an annular shape on the surface 501 of the substrate 500. Then, the diagnostic circuit 250 included in the integrated circuit 550 detects whether or not ink mist adheres to the wiring substrate 130 based on change in impedance generated in the annular wiring 504.

Specifically, the surface 501 of the substrate 500 has the annular wiring 504 arranged in an annular shape on the substrate 500 in a state where one end is electrically coupled to a terminal of the integrated circuit 550, and the other end is electrically coupled to a terminal of the integrated circuit 550 different from the terminal to which the one end is electrically coupled. The integrated circuit 550 outputs an inspection signal having a predetermined potential from a terminal to which the one end of the annular wiring 504 is coupled, and detects the potential of a signal based on the inspection signal input to the terminal to which the other end of the annular wiring 504 is coupled. Then, the diagnostic circuit 250 included in the integrated circuit 550 determines whether or not the change in the impedance occurs in the annular wiring 504 based on whether the potential difference between the inspection signal output from the terminal to which the one end of the annular wiring 504 is coupled and the signal based on the inspection signal input to the terminal to which the other end of the annular wiring 504 is coupled is equal to or greater than a predetermined value.

As described above, the ink mist that enters into the ejecting head 100 is charged by the Lenard effect. When the charged ink mist adheres to the annular wiring 504, the impedance of the annular wiring 504 changes depending on the charge charged on the ink mist. By detecting the change in impedance, the integrated circuit 550 detects whether or not ink adheres to the wiring substrate 130 including the substrate 500.

Further, as shown in FIGS. 14 and 15, the annular wiring 504 is disposed in an annular shape along the outer periphery of the substrate 500 including the side 511, the side 512, the side 513, and the side 514. Most of the ink mist entering into the ejecting head 100 enters from the outer periphery of the wiring substrate 130 toward the inside of the wiring substrate 130. That is, a large amount of ink mist is floating in the vicinity of the outer periphery of the wiring substrate 130 as compared with the inside of the wiring substrate 130. Therefore, a large amount of ink mist adheres to the vicinity of the outer periphery of the substrate 500 as compared with the inside of the substrate 500. By disposing the annular wiring 504 along the outer periphery of the substrate 500 where ink is likely to adhere, a large amount of ink adheres to the annular wiring 504 when the ink mist enters into the ejecting head 100 and adheres to the substrate 500. That is, the diagnostic circuit 250 included in the integrated circuit 550 can efficiently detect whether or not ink mist adheres over a wide range of the substrate 500.

The annular wiring 504 as described above may be disposed in a wiring layer with the impedance that can change when ink adheres to the substrate 500, and may be provided in any wiring layer of the substrate 500; however, considering that a lot of ink mist is floating on the surface 501 of the substrate 500, it is preferable that the annular wiring 504 is disposed on the surface 501 of the substrate 500 as shown in FIGS. 14 and 15. In this way, it is possible to accurately detect the state of ink adhesion on the surface 501 of the substrate 500 where a large amount of ink mist can float, which, in turn, it is possible to enhance the accuracy of detecting whether or not the ink mist entering into the ejecting head 100 adheres to the substrate 500.

Then, at least a part of the annular wiring 504 may be formed with a charge exposed portion in which a charging portion is not protected by an insulating film, and further, it is preferable that at least a part of the charge exposed portion is exposed on the surface 501 of the substrate 500. When charged ink mist adheres to the charge exposed portion, the change in impedance generated in the annular wiring 504 becomes more remarkable, and as a result, the accuracy of detecting the presence or absence of ink adhering to the substrate 500 in the diagnostic circuit 250 of the integrated circuit 550 is further improved.

Further, as shown in FIGS. 14 and 15, a ground wiring 505 through which the ground signal propagates may be positioned between the annular wiring 504 and the sides 511, 512, 513, and 514. By positioning the ground wiring 505 to surround the annular wiring 504, the possibility that noise is superimposed on the annular wiring 504 is reduced, and as a result, the accuracy of detecting the presence or absence of ink adhering in the integrated circuit 550 is improved.

Further, in this case, the ground wiring 505 may have a ground exposed portion that is not protected by the insulating film, and it is preferable that the ground exposed portion corresponds to the charge exposed portion formed in the annular wiring 504. In this way, when ink mist entering into the ejecting head 100 adheres to the charge exposed portion of the annular wiring 504, the ink mist also adheres to the ground exposed portion of the ground wiring 505. As a result, the change in impedance generated in the annular wiring 504 when ink adheres to the substrate 500 becomes more remarkable, and the accuracy of detecting the presence or absence of ink adhering to the substrate 500 in the diagnostic circuit 250 of the integrated circuit 550 is further improved.

The charge exposed portion formed in the annular wiring 504 may be formed in the entire region of the annular wiring 504, or may be formed in a part of the annular wiring 504. Similarly, the ground exposed portion formed on the ground wiring 505 may be formed corresponding to the entire charge exposed portion formed on the annular wiring 504, or may be formed corresponding to a part of the charge exposed portion formed on the annular wiring 504.

6. Operational Effect

In the liquid ejecting apparatus 1 of the present embodiment configured as described above, the integrated circuit 550 including the diagnostic circuit 250 is provided on the surface 502 of the substrate 500, and the coupling portions 520 and 530 are provided on the surface 501 of the substrate 500. In this way, even if a large amount of ink mist enters into the ejecting head 100 through the gaps generated in the coupling portions 520 and 530, the ink mist may be blocked by the substrate 500 and thus the possibility that the ink mist adheres to the integrated circuit 550 is reduced. In this way, the possibility that malfunction of the integrated circuit 550 occurs due to the ink mist adhering to the integrated circuit 550 is reduced.

Further, in the liquid ejecting apparatus 1 of the present embodiment, the ejecting head 100 has the annular wiring 504 electrically coupled to the integrated circuit 550, and the integrated circuit 550 detects the ink mist adhering to the substrate 500 based on the change in the impedance of the annular wiring 504, which makes it possible to detect whether or not the ink mist adheres even in the region of the surface 501 of the substrate 500 where the integrated circuit 550 is not provided. That is, it is possible to improve the accuracy of detecting the ink entering into the ejecting head 100.

Further, in the liquid ejecting apparatus 1 of the present embodiment, the annular wiring 504 is disposed along the outer periphery of the substrate 500 including the sides 511, 512, 513, and 514 of the substrate 500, which makes it possible for the annular wiring 504 to efficiently detect whether or not ink adheres in a wide range of the substrate 500. In this way, the accuracy of detecting the ink entering into the ejecting head 100 in the integrated circuit 550 is further improved.

Although the embodiment and modification example have been described above, the present disclosure is not limited to the embodiment, and can be carried out in various aspects without departing from the gist of the present disclosure. For example, the above embodiments can be combined as appropriate.

The present disclosure includes a configuration substantially the same as the configuration described in the embodiment (for example, a configuration having the same function, method and result, or a configuration having the same purpose and effect). Further, the present disclosure also includes a configuration in which a non-essential part of the configuration described in the embodiment is replaced. Further, the present disclosure includes a configuration having the same operational effect as the configuration described in the embodiment or a configuration capable of achieving the same purpose. Further, the present disclosure includes a configuration in which a known technique is added to the configuration described in the embodiment.

The following contents are derived from the above-described embodiment.

A liquid ejecting apparatus according to an aspect includes a print head that ejects a liquid, a digital signal output circuit that outputs a digital signal to the print head, and a liquid accommodating container that supplies the liquid to the print head, in which the print head includes a supply port to which the liquid is supplied from the liquid accommodating container, a nozzle plate having a plurality of nozzles that eject the liquid, a substrate having first and second sides positioned opposite to each other, third and fourth sides positioned opposite to each other, a first surface, and a second surface different from the first surface, a connector to which the digital signal is input, an integrated circuit to which the digital signal is input via the connector and that outputs an abnormality detection signal indicating presence or absence of an abnormality in the print head, and in which the connector is provided on the first surface, the integrated circuit is provided on the second surface, the substrate includes an annular wiring electrically coupled to the integrated circuit, and the annular wiring is disposed in an annular shape along an outer periphery of the substrate including the first side, the second side, the third side, and the fourth side.

With the liquid ejecting apparatus, the integrated circuit and the connector are provided on different surfaces of the substrate. In this way, even if ink mist enters into the print head through a gap generated in the vicinity of the connector, the substrate positioned between the connector and the integrated circuit blocks the entrance of ink mist, and thus the possibility that the ink mist adheres to the integrated circuit that outputs an abnormality detection signal indicating the presence or absence of an abnormality in the print head is reduced. Therefore, the possibility that an abnormality occurs in the operation of the integrated circuit is reduced.

Further, the print head has an annular wiring provided on the substrate and electrically coupled to the integrated circuit. In this way, the integrated circuit can also detect the ink mist adhering to the first surface different from the second surface of the substrate on which the integrated circuit is positioned, based on the change in characteristics such as impedance generated in the annular wiring. Therefore, the accuracy of detecting ink mist by the integrated circuit is improved.

Further, by disposing the annular wiring in an annular shape along the outer periphery of the substrate including the first side, the second side, the third side, and the fourth side, it is possible to detect whether or not the ink mist adheres in a wide range in the substrate.

In the liquid ejecting apparatus according to the aspect, the supply port may be positioned above the substrate in a vertical direction.

In the liquid ejecting apparatus according to the aspect, the substrate may be positioned so that the first surface faces upward and the second surface faces downward in a vertical direction.

In the liquid ejecting apparatus according to the aspect, the substrate may be positioned so that the first surface is orthogonal to the vertical direction.

With the liquid ejecting apparatus, even if ink leaks from the ink supply port, the possibility that the leaked ink unintentionally adheres to the integrated circuit is reduced, and as a result, the possibility that malfunction of the integrated circuit occurs is reduced.

In the liquid ejecting apparatus according to the aspect, the print head may have an ejecting module that includes the nozzle plate, and the integrated circuit may be positioned between the substrate and the ejecting module.

The liquid ejecting apparatus according to the aspect may further include the print head may have a liquid flow path that communicates with the supply port, and at least a part of the liquid flow path may pass through a penetrating portion that penetrates the first surface and the second surface of the substrate.

In the liquid ejecting apparatus according to the aspect, the integrated circuit may be a surface mount component.

In the liquid ejecting apparatus according to the aspect, the integrated circuit and the substrate may be electrically coupled to each other via a bump electrode.

With the liquid ejecting apparatus, it is possible to increase the density of electrodes that electrically couple the integrated circuit to the substrate, and it is possible to reduce the size of the integrated circuit and the substrate on which the integrated circuit is provided.

In the liquid ejecting apparatus according to the aspect, the integrated circuit may output a low-level abnormality detection signal when an abnormality occurs in the print head.

In the liquid ejecting apparatus according to the aspect, the integrated circuit may output a high-level abnormality detection signal when an abnormality occurs in the print head.

With the liquid ejecting apparatus, it is possible to quickly transmit a simple signal indicating whether or not an abnormality occurs in the print head, and as a result, it is possible to take appropriate measures early for the abnormality that occurs in the print head.

In the liquid ejecting apparatus according to the aspect, the digital signal may include a signal that defines an ejection timing of the liquid.

In the liquid ejecting apparatus according to the aspect, the digital signal may include a clock signal.

The liquid ejecting apparatus according to the aspect may further include a trapezoidal waveform signal output circuit that outputs a trapezoidal waveform signal including a trapezoidal waveform having a voltage value larger than that of the digital signal, and the trapezoidal waveform signal may be input to the connector.

In the liquid ejecting apparatus according to the aspect, the annular wiring may include a charge exposed portion in which a charging portion is not protected by an insulating film.

With the liquid ejecting apparatus, the change in characteristics such as impedance generated in the annular wiring becomes remarkable when ink mist adheres to the annular wiring. Therefore, the accuracy of detecting ink mist by the integrated circuit is further improved.

In the liquid ejecting apparatus according to the aspect, a ground wiring may be positioned between the annular wiring and the first side.

With the liquid ejecting apparatus, the ground wiring functions as a shield, and thus the possibility that noise or the like is superimposed on the annular wiring is reduced. As a result, the accuracy of the signal input to the integrated circuit is improved, and the accuracy of detecting ink mist by the integrated circuit is further improved.

What is claimed is:

1. A liquid ejecting apparatus comprising:
- a print head that ejects a liquid;
- a digital signal output circuit that outputs a digital signal to the print head; and
- a liquid accommodating container that supplies the liquid to the print head, wherein
- the print head includes
  - a supply port to which the liquid is supplied from the liquid accommodating container,
  - a nozzle plate having a plurality of nozzles that eject the liquid,
  - a substrate having first and second sides positioned opposite to each other, third and fourth sides positioned opposite to each other, a first surface, and a second surface different from the first surface,
  - a connector to which the digital signal is input, and
  - an integrated circuit to which the digital signal is input via the connector and that outputs an abnormality detection signal indicating presence or absence of an abnormality in the print head,
- the connector is provided on the first surface,
- the integrated circuit is provided on the second surface,
- the substrate includes an annular wiring electrically coupled to the integrated circuit, and
- the annular wiring is disposed in an annular shape along an outer periphery of the substrate including the first side, the second side, the third side, and the fourth side.

2. The liquid ejecting apparatus according to claim 1, wherein
- the supply port is positioned above the substrate in a vertical direction.

3. The liquid ejecting apparatus according to claim 1, wherein
- the substrate is positioned so that the first surface faces upward and the second surface faces downward in a vertical direction.

4. The liquid ejecting apparatus according to claim 1, wherein
- the substrate is positioned so that the first surface is orthogonal to a vertical direction.

5. The liquid ejecting apparatus according to claim 1, wherein
- the print head has an ejecting module that includes the nozzle plate, and
- the integrated circuit is positioned between the substrate and the ejecting module.

6. The liquid ejecting apparatus according to claim 1, wherein
- the print head has a liquid flow path that communicates with the supply port, and
- at least a portion of the liquid flow path passes through a penetrating portion that penetrates the first surface and the second surface of the substrate.

7. The liquid ejecting apparatus according to claim 1, wherein
- the integrated circuit is a surface mount component.

8. The liquid ejecting apparatus according to claim 7, wherein
- the integrated circuit and the substrate are electrically coupled to each other via a bump electrode.

9. The liquid ejecting apparatus according to claim 1, wherein the integrated circuit outputs a low-level abnormality detection signal when an abnormality occurs in the print head.

10. The liquid ejecting apparatus according to claim 1, wherein the integrated circuit outputs a high-level abnormality detection signal when an abnormality occurs in the print head.

11. The liquid ejecting apparatus according to claim 1, wherein the digital signal includes a signal that defines an ejection timing of the liquid.

12. The liquid ejecting apparatus according to claim 1, wherein the digital signal includes a clock signal.

13. The liquid ejecting apparatus according to claim 1, further comprising a trapezoidal waveform signal output circuit that outputs a trapezoidal waveform signal including a trapezoidal waveform having a voltage value larger than that of the digital signal, wherein the trapezoidal waveform signal is input to the connector.

14. The liquid ejecting apparatus according to claim 1, wherein the annular wiring includes a charge exposed portion in which a charging portion is not protected by an insulating film.

15. The liquid ejecting apparatus according to claim 1, wherein a ground wiring is positioned between the annular wiring and the first side.

* * * * *